US008275679B2

(12) United States Patent
Kino

(10) Patent No.: US 8,275,679 B2
(45) Date of Patent: Sep. 25, 2012

(54) BILLING MANAGEMENT SYSTEM, IMAGE FORMING APPARATUS, BILLING MANAGEMENT APPARATUS, BILLING INFORMATION RECORDING METHOD, AND STORAGE MEDIUM

(75) Inventor: Tetsuro Kino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 123 days.

(21) Appl. No.: 12/795,163

(22) Filed: Jun. 7, 2010

(65) Prior Publication Data

US 2011/0022505 A1 Jan. 27, 2011

(30) Foreign Application Priority Data

Jul. 27, 2009 (JP) ................................. 2009-174609

(51) Int. Cl.
*G07F 19/00* (2006.01)
*H04M 15/00* (2006.01)
*G06K 15/22* (2006.01)

(52) U.S. Cl. ......................................... 705/34; 358/1.14

(58) Field of Classification Search .................... 705/34; 385/1.14

See application file for complete search history.

(56) References Cited

U.S. PATENT DOCUMENTS

| | | | | |
|---|---|---|---|---|
| 2003/0013413 | A1* | 1/2003 | Berkema et al. | 455/41 |
| 2003/0133147 | A1* | 7/2003 | Peeters | 358/1.15 |
| 2003/0191655 | A1* | 10/2003 | Janz | 705/1 |
| 2003/0191718 | A1* | 10/2003 | Blair | 705/51 |
| 2005/0203805 | A1* | 9/2005 | Clough et al. | 705/26 |
| 2007/0103716 | A1* | 5/2007 | Shiraiwa et al. | 358/1.14 |
| 2008/0091800 | A1 | 4/2008 | Sorrentino et al. | |
| 2008/0174804 | A1* | 7/2008 | Hsu et al. | 358/1.15 |
| 2009/0077164 | A1 | 3/2009 | Phillips et al. | |
| 2009/0138965 | A1 | 5/2009 | Ferlitsch | |
| 2010/0067036 | A1* | 3/2010 | Oka | 358/1.14 |

FOREIGN PATENT DOCUMENTS

| | | |
|---|---|---|
| JP | 2004-133921 | 4/2004 |
| JP | 2008-10993 | 1/2008 |
| JP | 2008-59232 | 3/2008 |

OTHER PUBLICATIONS

"US Patent Issued to Kabushiki Kaisha Toshiba, Toshiba Tec on Nov. 16 for "Image Forming Apparatus Which Determines Billing Amount" (Japanese Inventor)." US Fed News Service, Including US State News Nov. 17, 2010,Research Library, ProQuest. Web. May 21, 2012.*

Extended European Search Report issued Nov. 5, 2010, in Application No. / Patent No. 10251137.5-1238.

* cited by examiner

*Primary Examiner* — Seye Iwarere

(74) *Attorney, Agent, or Firm* — Oblon, Spivak, McClelland, Maier & Neustadt, L.L.P.

(57) ABSTRACT

A billing management system includes an image forming apparatus and a billing management apparatus. The image forming apparatus includes a process information receiving unit for receiving process information indicating a list of processes in a process flow; a registration unit for transmitting identification information for the process flow to the billing management apparatus; a process execution unit for performing a first process assigned to the image forming apparatus; a billing information transmitting unit for transmitting billing information for the first process to the billing management apparatus; and a data transfer unit for transferring output data of the first process to a service providing apparatus that is to perform a second process. The billing management apparatus receives the billing information for the first and second processes from the image forming apparatus and the service providing apparatus and records the billing information in association with the identification information.

15 Claims, 26 Drawing Sheets

1

FIG.8

| | | | | |
|---|---|---|---|---|
| WIDGET ID | trans_copy001 | | | |
| USER ID | USER A | | | |
| WIDGET ADDRESS | http://xxx/xxx/yyy | | | |
| DISPLAY NAME | TRANSLATION-AND-COPYING | | | |
| PROCESS FLOW INFORMATION | SERVICE NAME | PROVIDER NAME | URL | CONFIGURATION INFORMATION |
| | SCANNING | ABC | | ...... |
| | OCR | XX SERVICE CO. LTD. | http://XX.co.jp/XXservice | ...... |
| | TRANSLATION | YY SERVICE CO. LTD. | http://YY.co.jp/YYservice | ...... |
| | PRINTING | ABC | | ...... |

FIG.9

141

| USER ID | WIDGET INFORMATION URL |
|---|---|
| USER A | http://xxxxxxxxxxxxx |
| USER B | ····· |
| : | : |

FIG.12

| | | | | |
|---|---|---|---|---|
| WIDGET ID | trans_copy001 | | | |
| USER ID | USER A | | | |
| WIDGET ADDRESS | http://xxx/xxx/yyy | | | |
| DISPLAY NAME | TRANSLATION-AND-COPYING | | | |
| PROCESS FLOW INFORMATION | SERVICE NAME | PROVIDER NAME | URL | CONFIGURATION INFORMATION |
| | SCANNING | ABC | | ...... |
| | OCR | XX SERVICE CO. LTD. | http://XX.co.jp/XXservice | ...... |
| | TRANSLATION | YY SERVICE CO. LTD. | http://YY.co.jp/YYservice | ...... |
| | PRINTING | ABC | | ...... |
| WIDGET RELAY URL | http://yyyyyyyyy | | | |

FIG.15

| JOB TRACKING ID | job001 | | | | |
|---|---|---|---|---|---|
| PROCESS FLOW INFORMATION | SERVICE NAME | CHARGE COUNT | PROVIDER NAME | URL | PROCESSING RESULT |
| | SCANNING | | ABC | | |
| | OCR | | XX SERVICE CO. LTD. | http://XX.co.jp/XXservice | |
| | TRANSLATION | | YY SERVICE CO. LTD. | http://YY.co.jp/YYservice | |
| | PRINTING | | ABC | | |

FIG.16

| JOB TRACKING ID | job001 | | | | |
|---|---|---|---|---|---|
| PROCESS FLOW INFORMATION | SERVICE NAME | CHARGE COUNT | PROVIDER NAME | URL | PROCESSING RESULT |
| | SCANNING | 1 | ABC | | OK |
| | OCR | 2 | XX SERVICE CO. LTD. | http://XX.co.jp/XXservice | OK |
| | TRANSLATION | 5 | YY SERVICE CO. LTD. | http://YY.co.jp/YYservice | OK |
| | PRINTING | 1 | ABC | | OK |

FIG.19

| JOB TRACKING ID | job001 | | | | |
| --- | --- | --- | --- | --- | --- |
| PROCESS FLOW INFORMATION | SERVICE NAME | CHARGE COUNT | PROVIDER NAME | URL | PROCESSING RESULT |
| | SCANNING | 1 | ABC | | OK |
| | OCR | | XX SERVICE CO. LTD. | http://XX.co.jp/XXservice | FAILED |
| | TRANSLATION | | YY SERVICE CO. LTD. | http://YY.co.jp/YYservice | |
| | PRINTING | | ABC | | |

FIG.23

| JOB TRACKING ID | job001 | | | | |
|---|---|---|---|---|---|
| PROCESS FLOW INFORMATION | SERVICE NAME | CHARGE COUNT | PROVIDER NAME | URL | PROCESSING RESULT |
| | SCANNING | 0 | ABC | | OK |
| | OCR | | XX SERVICE CO. LTD. | http://XX.co.jp/XXservice | FAILED |
| | TRANSLATION | | YY SERVICE CO. LTD. | http://YY.co.jp/YYservice | |
| | PRINTING | | ABC | | |

BILLING MANAGEMENT SYSTEM, IMAGE FORMING APPARATUS, BILLING MANAGEMENT APPARATUS, BILLING INFORMATION RECORDING METHOD, AND STORAGE MEDIUM

BACKGROUND OF THE INVENTION

1. Field of the Invention

A certain aspect of the present invention relates to a billing management system, an image forming apparatus, a billing management apparatus, a billing information recording method, and a storage medium.

2. Description of the Related Art

Mechanisms for enabling an image forming apparatus to operate in cooperation with an application running on a separate computer connected via a network to the image forming apparatus have been proposed in these years (see, for example, Japanese Patent Application Publication No. 2008-10993).

Meanwhile, an image forming apparatus may include a billing function in addition to its inherent functions for copying, printing, faxing, and/or scanning. For example, an image forming apparatus may include counters for recording usage of the respective functions and a mechanism for increasing the counters according to the usage of the functions. In the case of a leased image forming apparatus installed in an office, for example, a service person of the manufacturer of the image forming apparatus regularly checks the counters and charges the office based on the values of the counters. As another example, there is an image forming apparatus with a coin box for charging a user on site for use of a function (e.g., copying).

Here, when an image forming apparatus operates in cooperation with a fee-based external application, charges for a service provided by the application are billed separately by the provider of the application. In other words, even if it seems like "one" service for a user, charges for a service provided by the image forming apparatus and charges for a service provided by the external application are separately billed to the user. This is particularly bothersome for the user if the charges are billed (e.g., invoices are sent) at different timings. Also, if the charges are on a pay-as-you-go basis, it is bothersome for the user to compare the actual usage of the services with that written on multiple invoices and determine whether the charges are correct.

SUMMARY OF THE INVENTION

An aspect of the present invention provides a billing management system including an image forming apparatus and a billing management apparatus. The image forming apparatus includes a process information receiving unit configured to receive process information indicating a list of processes to be performed in a process flow requested by an information processing apparatus connected via a network to the image forming apparatus; a registration unit configured to generate identification information for the process flow and to transmit the identification information to the billing management apparatus; a process execution unit configured to perform a first process in the list of processes which is assigned to the image forming apparatus; a billing information transmitting unit configured to transmit billing information for the first process performed by the process execution unit together with the identification information to the billing management apparatus; and a data transfer unit configured to transfer output data of the first process performed by the process execution unit together with the identification information to a service providing apparatus that is to perform a second process in the list of processes. The billing management apparatus includes an identification information receiving unit configured to receive and register the identification information transmitted from the image forming apparatus; a billing information receiving unit configured to receive the billing information for the first process and the second process together with the identification information from the image forming apparatus and the service providing apparatus; and a billing information fixing unit configured to record the billing information for the first process and the second process in a billing information storing unit in association with the identification information.

Another aspect of the present invention provides a method of recording billing information performed by an image forming apparatus and a billing management apparatus. The method includes the steps, performed by the image forming apparatus, of receiving process information indicating a list of processes to be performed in a process flow requested by an information processing apparatus connected via a network to the image forming apparatus; generating identification information for the process flow and transmitting the identification information to the billing management apparatus; performing a first process in the list of processes which is assigned to the image forming apparatus; transmitting billing information for the first process together with the identification information to the billing management apparatus; and transferring output data of the first process together with the identification information to a service providing apparatus that is to perform a second process in the list of processes. The method further includes the steps, performed by the billing management apparatus, of receiving and registering the identification information transmitted from the image forming apparatus; receiving the billing information for the first process and the second process together with the identification information from the image forming apparatus and the service providing apparatus; and recording the billing information for the first process and the second process in a billing information storing unit in association with the identification information.

BRIEF DESCRIPTION OF THE DRAWINGS

FIG. 8 is a table showing exemplary widget information of a translation-and-copying widget;

FIG. 9 shows an exemplary configuration of a user management table;

FIG. 12 is a table showing an exemplary configuration of widget information of a translation-and-copying widget which is to be transmitted from a widget manager to a provider application;

FIG. 15 is a table showing an exemplary configuration of job tracking data;

FIG. 16 is a table showing exemplary job tracking data where charge counts and execution results are recorded;

FIG. 19 is a table showing exemplary job tracking data in a case where an error has occurred;

FIG. 23 is a table showing exemplary job tracking data where charge counts are nullified.

DESCRIPTION OF THE PREFERRED EMBODIMENTS

Figure 1:
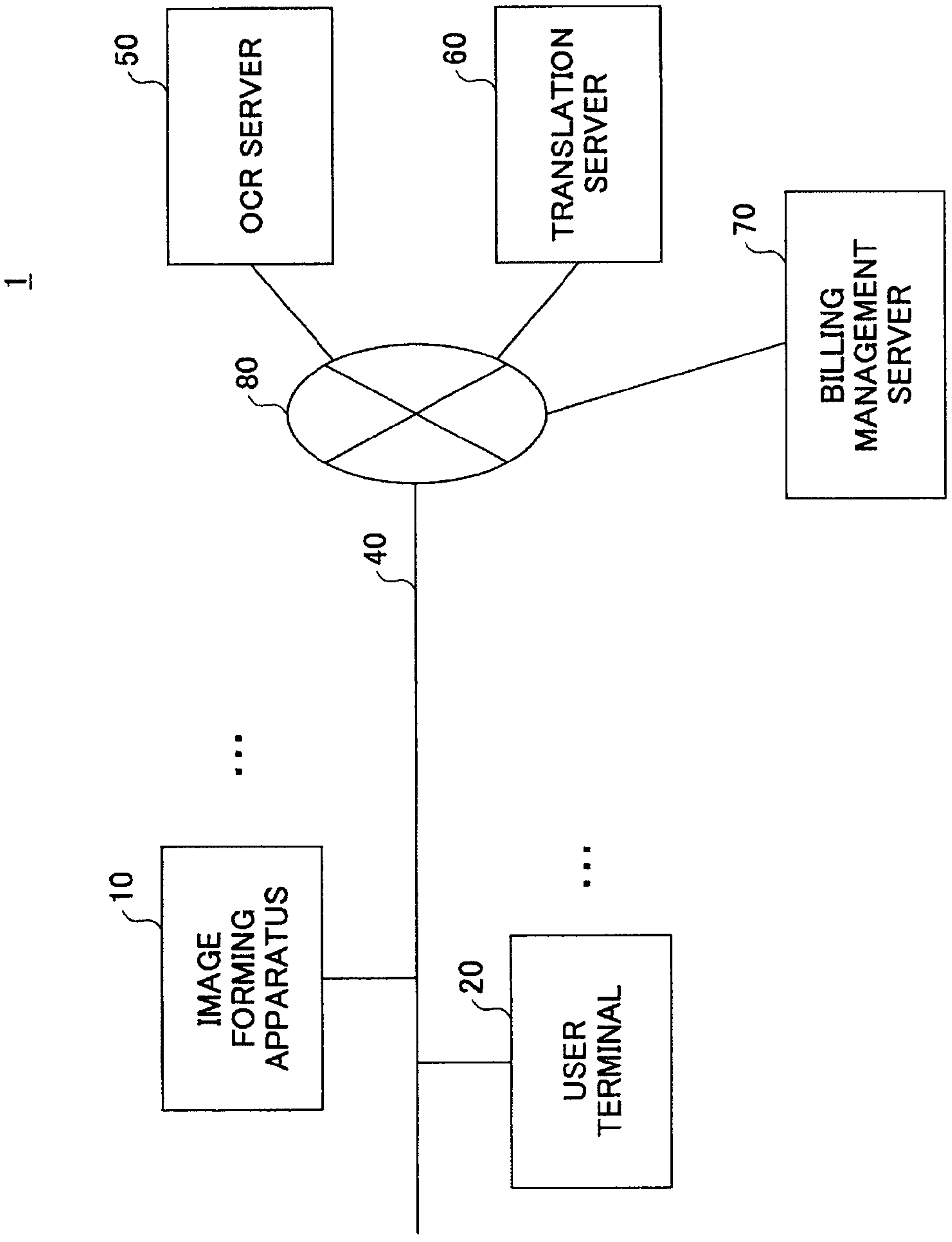
FIG. 1 is a drawing illustrating an exemplary configuration of an information processing system according to an embodiment of the present invention.

Preferred embodiments of the present invention are described below with reference to the accompanying drawings. FIG. 1 is a drawing illustrating an exemplary configuration of an information processing system according to an embodiment of the present invention. An information processing system 1 shown in FIG. 1 includes at least one image forming apparatus 10 and at least one user terminal 20 that are connected via a (wired or wireless) network 40 such as a local area network (LAN). The information processing system 1 further includes an OCR server 50, a translation server 60, and a billing management server (billing management apparatus) 70 that are connected via a wide area network 80 to the network 40. Here, the image forming apparatus 10 and the billing management server 70 may constitute a billing management system.

The image forming apparatus 10 is a multifunction peripheral including multiple functions (image forming functions) such as printing, scanning, copying, and facsimile transmission and reception in a body. Alternatively, the image forming apparatus 10 may be implemented by an apparatus such as a printer, a scanner, a copier, or a facsimile machine providing a single function. The image forming apparatus 10 records billing information for a used image forming function in a non-volatile recording medium such as a hard disk drive (HDD).

The user terminal 20 may be implemented by any type of device that can store and execute a software program and has a communication function. For example, the user terminal 20 may be implemented by an information processing apparatus such as a desktop personal computer (PC), a notebook PC, a personal digital assistance (PDA), or a cell phone.

The OCR server 50 is an example of a service providing apparatus and implemented by a computer including an application program that provides an optical character recognition (OCR) function as a Web service (OCR service) via a network.

The translation server 60 is another example of a service providing apparatus and implemented by a computer including an application program that provides a function for translating (e.g., from English into Japanese) document data (e.g., text data) as a Web service (translation service) via a network.

The OCR server 50 and the translation server 60 charge for their services. Here, it is assumed that the OCR server 50 and the translation server 60 are being operated by service providers different from the provider of the image forming apparatus 10.

The billing management server 70 is a computer providing a Web service (billing management service) for integrally managing (or consolidating) billing information for services (performed processes) provided by the image forming apparatus 10, the OCR server 50, and the translation server 60. In this embodiment, it is assumed that the billing management server 70 is being operated by the manufacturer of the image forming apparatus 10. A service person of the image forming apparatus 10 bills a user based on billing information recorded in the billing management server 70.

Figure 2:
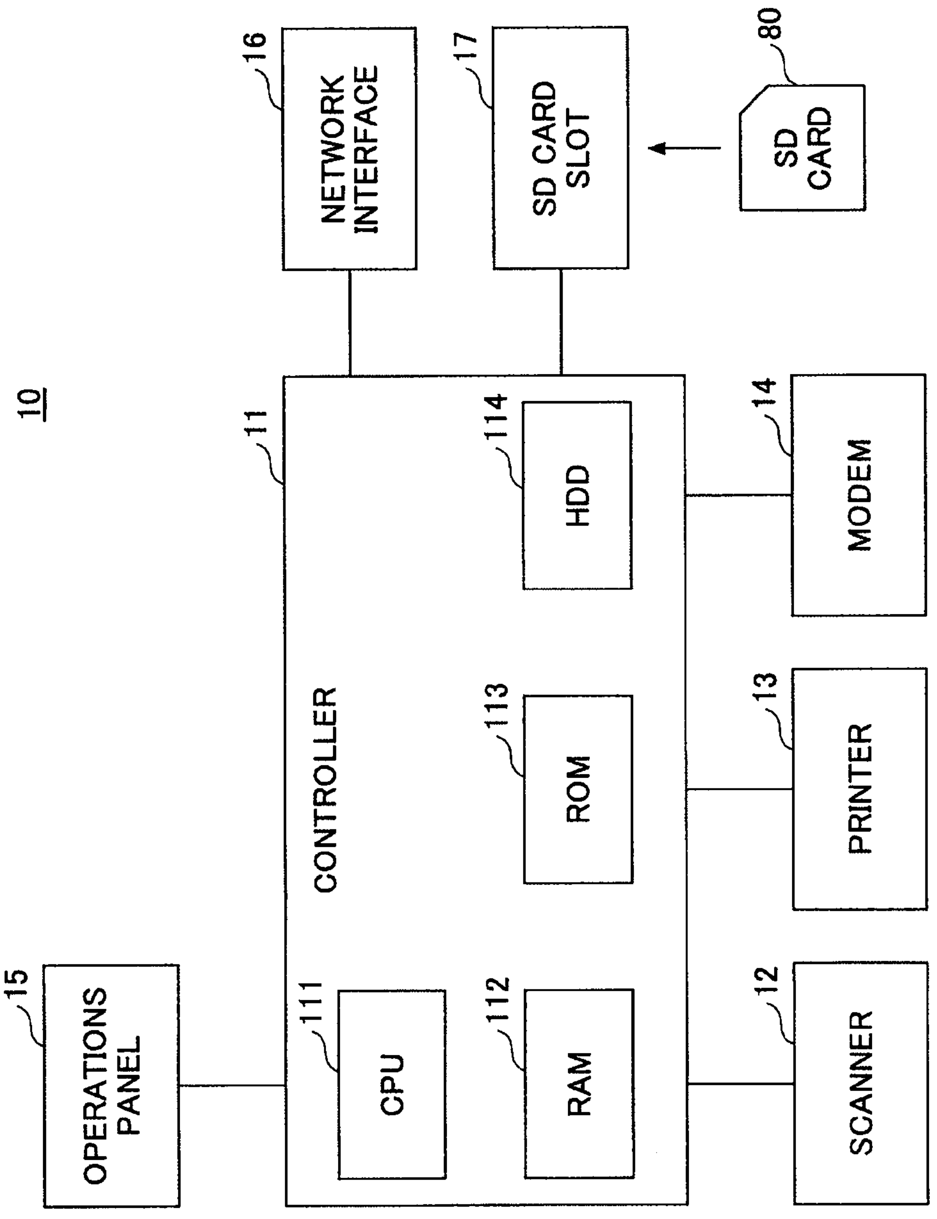
FIG. 2 is a block diagram illustrating an exemplary hardware configuration of an image forming apparatus according to an embodiment of the present invention.

FIG. 2 is a block diagram illustrating an exemplary hardware configuration of the image forming apparatus 10 of this embodiment. As shown in FIG. 2, the image forming apparatus 10 includes, as hardware components, a controller 11, a scanner 12, a printer 13, a modem 14, an operations panel 15, a network interface 16, and an SD card slot 17.

The controller 11 includes a CPU 111, a RAM 112, a ROM 113, and an HDD 114. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs.

The scanner 12 is hardware for scanning a document to obtain image data. The printer 13 is hardware for printing print data on a recording medium such as paper. The modem 14 is hardware for connecting the image forming apparatus 10 to a telephone line and is used to send and receive image data by facsimile communications. The operations panel 15 is hardware including an input unit such as buttons for receiving user inputs and a display unit such as a liquid crystal display panel. The network interface 16 is hardware for connecting the image forming apparatus 10 to a (wired or wireless) network such as a local area network (LAN). The SD card slot 17 reads, for example, programs stored in an SD card 80. Thus, with the image forming apparatus 10 of this embodiment, in addition to the programs stored in the ROM 113, programs stored in the SD card 80 can be loaded into the RAM 112 and executed.

Figure 3:
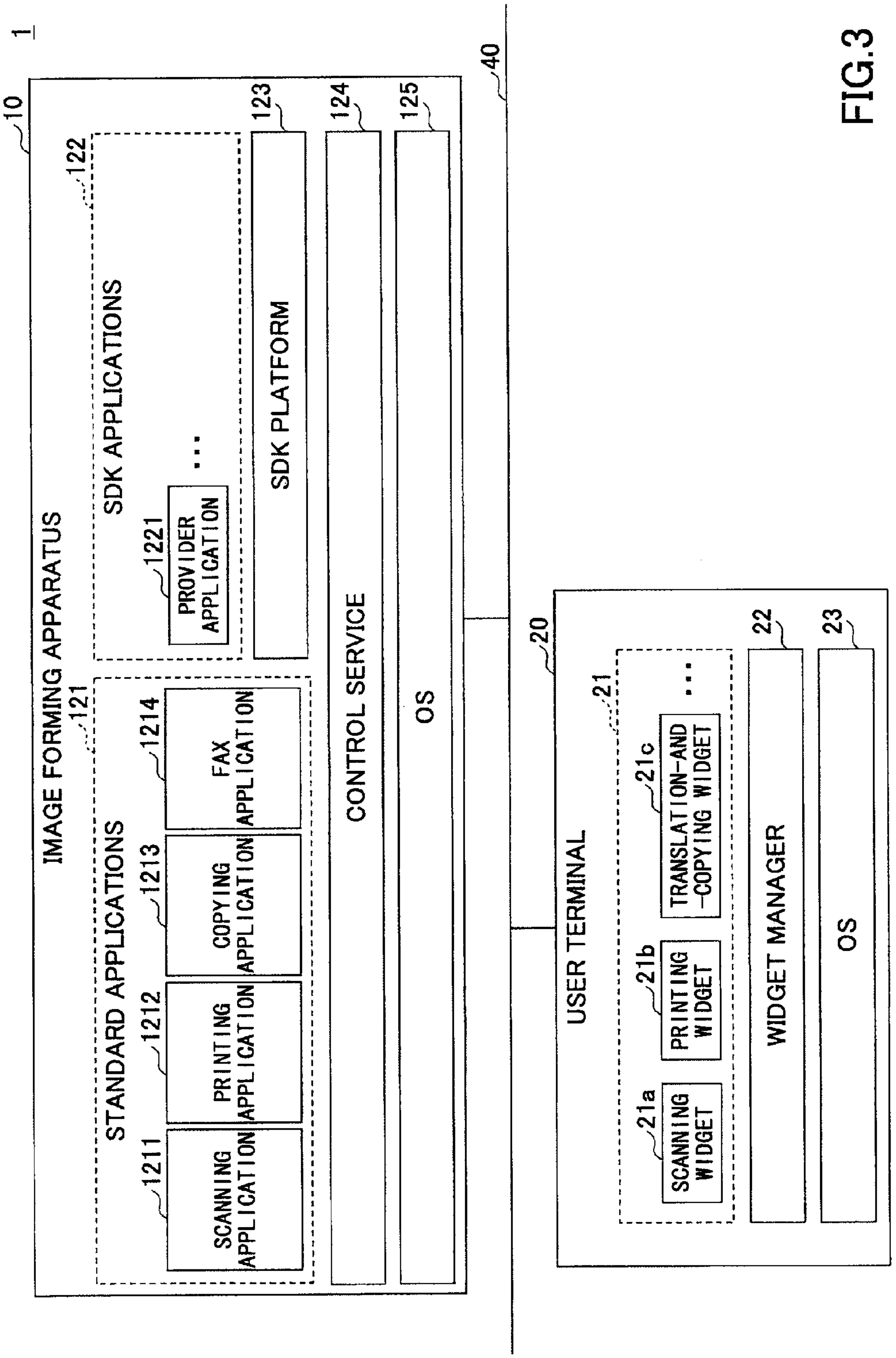
FIG. 3 is a block diagram illustrating exemplary software configurations of an image forming apparatus and a user terminal according to an embodiment of the present invention.

FIG. 3 is a block diagram illustrating exemplary software configurations of the image forming apparatus 10 and the user terminal 20 of this embodiment. As shown in FIG. 3, the user terminal 20 includes a scanning widget 21*a*, a printing widget 21*b*, a translation-and-copying widget 21*c*, a widget manager 22, and an OS 23.

The scanning widget 21*a*, the printing widget 21*b*, and the translation-and-copying widget 21*c* are application programs and are collectively called widgets 21 in this embodiment. In these years, simple application programs are often called widgets or gadgets. In this embodiment, application programs that can be easily installed and used are called the widgets 21 and the term "widget" is not used to limit the technical scope of application programs. Each of the widgets 21 (may be simply called the widget 21) of this embodiment performs (or controls) a process flow by using services provided by the image forming apparatus 10 and/or services provided on the network 80.

The scanning widget 21*a* requests the image forming apparatus 10 to scan a document to obtain image data and stores the obtained image data in the user terminal 20.

The printing widget 21*b* requests the image forming apparatus 10 to print document data stored in the user terminal 20.

The translation-and-copying widget 21*c* requests the image forming apparatus 10 to scan a document to obtain image data, requests the OCR server 50 to perform an OCR process on the obtained image data, requests the translation server 60 to translate text data obtained by the OCR process, and then requests the image forming apparatus 10 to print the translated text data. In other words, the translation-and-copying widget 21*c* performs, for example, a process flow where a document in Japanese is output as a result of copying a document in English.

The widget manager 22 functions as a framework for the widgets 21 and interfaces communications between the widgets 21 and the image forming apparatus 10. Each of the widgets 21 includes an interface and a protocol defined by the widget manager 22. In other words, the widgets 21 of this embodiment are application programs that operate in cooperation with the widget manager 22.

The OS 23 is an operating system. Software programs in the user terminal 20 run as processes or threads on the OS 23.

The image forming apparatus 10 includes standard applications 121, SDK applications 122, an SDK platform 123, a control service 124, and an OS 125.

The standard applications 121 are default applications installed in the image forming apparatus 10 before the factory shipment. In the exemplary configuration shown in FIG. 3, the standard applications 121 include a scanning application 1211, a printing application 1212, a copying application 1213, and a fax application 1214. The scanning application 1211 performs a scan job. The printing application 1212 performs a print job. The copying application 1213 performs a copy job. The fax application 1214 performs a facsimile transmission job and a facsimile reception job.

The control service 124 is implemented by software modules that, for example, provide upper-layer applications with functions for controlling various hardware resources. The functions, for example, include a network communication function, a scanner control function, a printer control function, and a memory management function.

The SDK applications 122 are plug-in applications that are additionally installed to expand the functions of the image forming apparatus 10 after its factory shipment. In FIG. 3, a provider application 1221 is shown as an example of the SDK applications 122. The provider application 1221 enables the user to operate the widgets 21 from the image forming apparatus 10 and causes the image forming apparatus 10 to perform processes requested by the widgets 21.

The SDK platform 123 provides an execution environment for the SDK applications 122. The SDK applications 122 are developed using application programming interfaces (API) provided by the SDK platform 123. For example, the SDK platform 123 provides the SDK applications 122 with a scanning function interface, a print function interface, and a copy function interface. APIs provided by the SDK platform 123 are made public to allow a third party to develop the SDK applications 122.

The OS 125 is an operating system. Software programs in the image forming apparatus 10 run as processes or threads on the OS 125.

Figure 4:
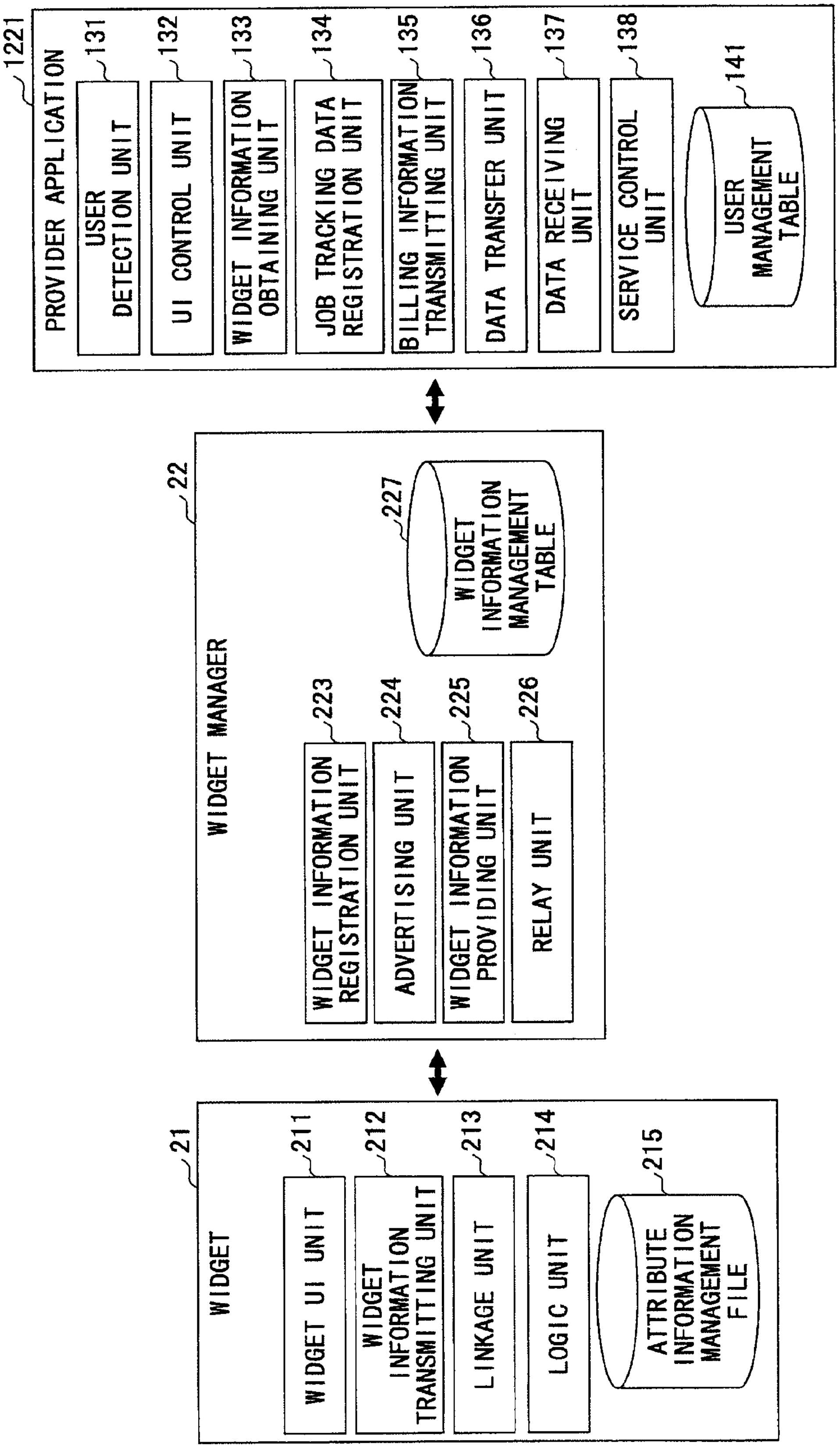
FIG. 4 is a block diagram illustrating exemplary functional configurations of a widget, a widget manager, and a provider application according to a first embodiment of the present invention.

The widget 21, the widget manager 22, and the provider application 1221 are described below in more detail. FIG. 4 is a block diagram illustrating exemplary functional configurations of the widget 21, the widget manager 22, and the provider application 1221 according to a first embodiment of the present invention.

As shown in FIG. 4, the widget 21 includes a widget UI unit 211, a widget information transmitting unit 212, a linkage unit 213, a logic unit 214, and an attribute information management file 215.

The widget UI unit 211 displays various screens related to the widget 21 on a display unit of the user terminal 20. The widget information transmitting unit 212 transmits a registration request for widget information to the widget manager 22 when the widget 21 is activated. The widget information (process information) includes information necessary to execute the widget 21 (e.g., information regarding a process flow). The linkage unit 213 controls communications (transmission and reception of information) with the widget manager 22. The attribute information management file 215 contains configuration information (widget information) for the widget 21. The logic unit 214 implements a function unique to the widget 21.

The widget manager 22 includes a widget information registration unit 223, an advertising unit 224, a widget information providing unit 225, a relay unit 226, and a widget information management table 227.

The widget information registration unit 223 receives a registration request for widget information from the widget 21 and stores the widget information in the widget information management table 227. The widget information management table 227 stores widget information of the widgets 21 running on the user terminal 20 and is generated in a storage unit of the user terminal 20.

The advertising unit 224 advertises (broadcasts or multicasts), for example, a user ID contained in the widget information received by the widget information registration unit 223 on the network. The advertisement is issued for each user (each user ID). That is, after an advertisement for user A is issued in response to the activation of a widget 21 of the user terminal 20, no advertisement is issued even if another widget 21 of the same user terminal 20 is activated. In this embodiment, for descriptive purposes, it is assumed that the user terminal 20 corresponds one-to-one to a user. Accordingly, the advertisement issued by the advertising unit 224 is used to report to the image forming apparatus 10 new entry of a user allowed to use a widget 21. Alternatively, the advertisement may be issued for each set of widget information. In this case, the image forming apparatus 10 may be configured to remove duplicate advertisements issued for the same user.

In response to a request from the image forming apparatus 10, the widget information providing unit 225 provides (transmits) the widget information registered in the widget information management table 227 to the image forming apparatus 10. The relay unit 226 relays communications between the widget 21 and the provider application 1221.

The provider application 1221 includes a user detection unit 131, a UI control unit 132, a widget information obtaining unit (process information receiving unit) 133, a job tracking data registration unit 134, a billing information transmitting unit 135, a data transfer unit 136, a data receiving unit 137, a service control unit (process execution unit) 138, and a user management table 141.

The user detection unit 131 detects a user allowed to use the widget 21 based on an advertisement issued by the widget manager 22 and registers, for example, a user ID contained in the advertisement in the user management table 141. The user management table 141 is used to manage a list of users who have activated the widgets 21 on the network.

The UI control unit 132 receives user inputs such as commands for operating the widgets 21. Thus, although the widgets 21 are stored in the user terminal 20, they can also be operated by using the operations panel 15 of the image forming apparatus 10. The widget information obtaining unit 133 obtains, from the widget manager 22, the widget information of a selected widget 21 that belongs to a user (user ID) selected from the users (user IDs) registered in the user management table 141.

The job tracking data registration unit 134, when starting a process flow of the selected widget 21, generates job tracking data (JTD) (or a job tracking ID) for the process flow, and transmits the generated job tracking data (or the job tracking ID) to the billing management server 70 (i.e., registers the job tracking data in the billing management server 70). The job tracking data are used to record, for each service used in the process flow performed by the widget 21, billing information indicating a charge count and information (processing result) indicating success or failure of a process performed to provide the service. The job tracking data registration unit 134 also generates unique identification information (job tracking ID) and assigns the identification information to the corresponding job tracking data.

The billing information transmitting unit 135 transmits, to the billing management server 70, billing information for a service(s) (process) in the process flow which is performed by the image forming apparatus 10 together with the job tracking ID.

The data transfer unit 136 transfers, for example, output data of a service(s) (process) that is in the process flow of the selected widget 21 and performed by the image forming apparatus 10 together with the job tracking ID to the widget manager 22.

The data receiving unit 137 receives, for example, output data of services performed by servers (e.g., the OCR server 50 and the translation server 60) other than the image forming apparatus 10 together with the job tracking ID from the widget manager 22.

The service control unit 138 controls execution of services requested by the widget 21. Actual processes for providing the services are performed by the standard applications 121 and the SDK applications 122 other than the provider application 1221.

Figure 5:
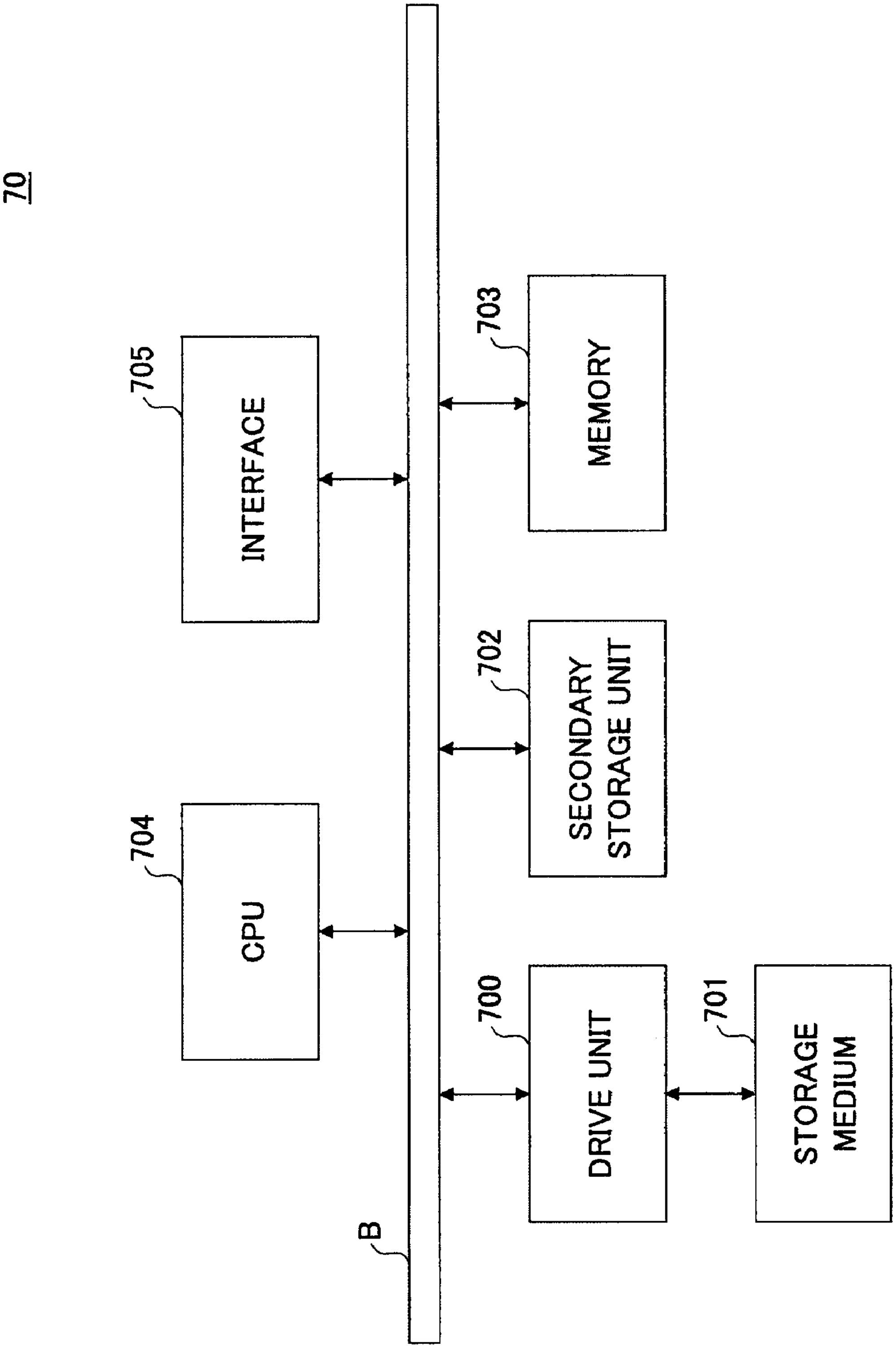
FIG. 5 is a block diagram illustrating an exemplary hardware configuration of a billing management server according to an embodiment of the present invention.

Details of the billing management server 70 are described below. FIG. 5 is a block diagram illustrating an exemplary hardware configuration of the billing management server 70. As shown in FIG. 5, the billing management server 70 includes a drive unit 700, a secondary storage unit 702, a memory 703, a CPU 704, and an interface 705 that are connected to each other via a bus B.

Programs for implementing various processes at the billing management server 70 may be provided by a storage medium 701 such as a CD-ROM. When the storage medium 701 containing programs is mounted on the drive unit 700, the programs are installed from the storage medium 701 via the drive unit 700 into the secondary storage unit 702. The programs may not necessarily be installed from the storage medium 701, but may instead be downloaded via a network from another computer. The secondary storage unit 702 stores the installed programs and other necessary files and data.

The memory 703 temporarily stores programs retrieved from the secondary storage unit 702 when the programs are executed. The CPU 704 performs functions of the billing management server 70 according to the programs temporarily stored in the memory 703. The interface 705 connects the billing management server 70 to a network.

Figure 6:
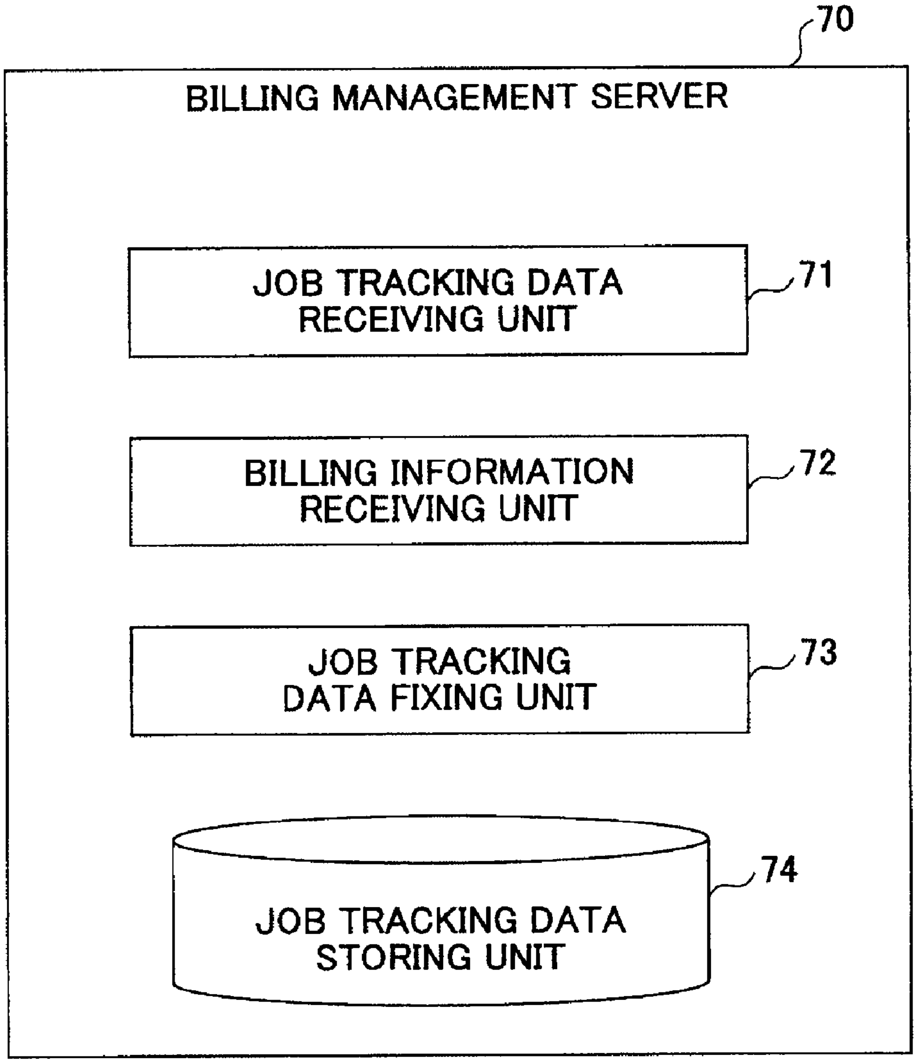
FIG. 6 is a block diagram illustrating an exemplary functional configuration of a billing management server according to the first embodiment.

FIG. 6 is a block diagram illustrating an exemplary functional configuration of the billing management server 70 according to the first embodiment. As shown in FIG. 6, the billing management server 70 includes a job tracking data receiving unit 71, a billing information receiving unit 72, a job tracking data fixing unit 73, and a job tracking data storing unit 74. These units are implemented by executing programs installed in the billing management server 70 by the CPU 704.

The job tracking data receiving unit 71 receives job tracking data (or a job tracking ID) from the job tracking data registration unit 134 of the image forming apparatus 10 and stores the job tracking data (or the job tracking ID) in the memory 703. The billing information receiving unit 72 receives a job tracking ID and billing information for services (processes) performed in a process flow from the corresponding servers (e.g., the image forming apparatus 10, the OCR server 50, and the translation server 60), and records the billing information in the job tracking data corresponding to the job tracking ID. The job tracking data fixing unit 73 records the job tracking data in the job tracking data storing unit 74 when the process flow is completed (or terminated). The job tracking data storing unit 74 is a storage area for permanently managing the job tracking data and may be provided in the secondary storage unit 702.

Figure 7:
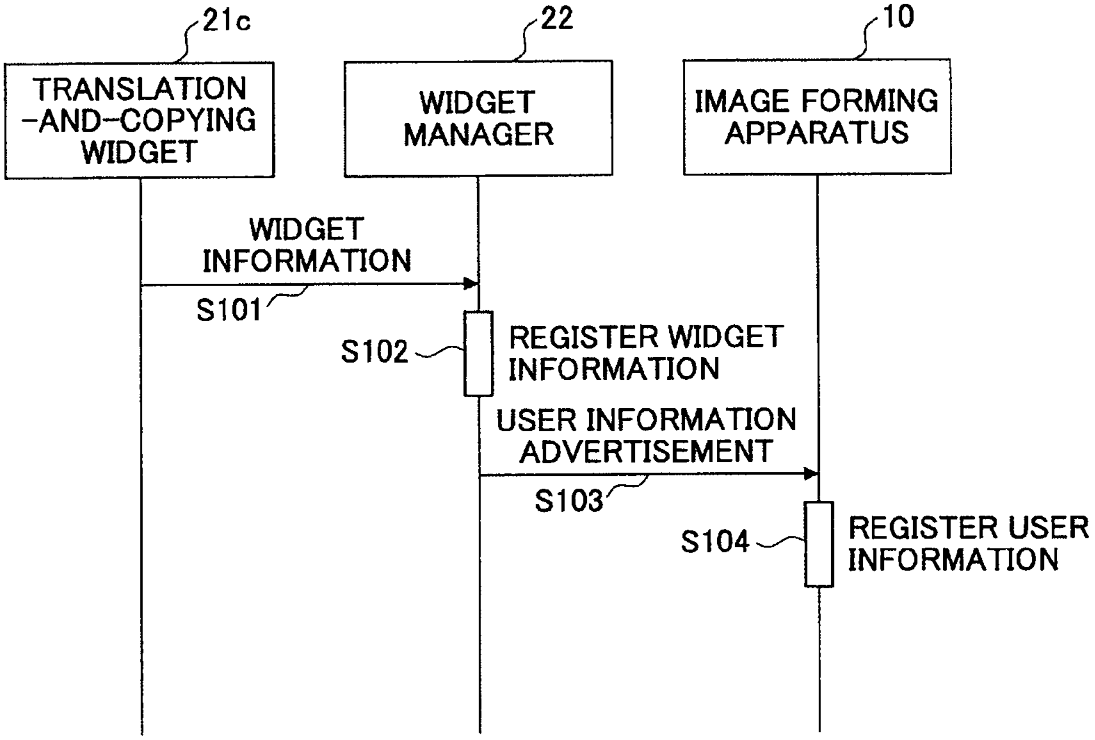
FIG. 7 is a sequence chart showing a process performed when a widget is activated.

Exemplary processes in the information processing system 1 are described below. FIG. 7 is a sequence chart showing a process performed when a widget is activated. In FIG. 7, it is assumed that the widget manager 22 has already been activated.

For example, when the translation-and-copying widget 21*c* is activated in response to a user request, the widget information transmitting unit 212 of the translation-and-copying widget 21*c* obtains the corresponding widget information from the attribute information management file 215 and transmits the obtained widget information to the widget information registration unit 223 of the widget manager 22 (S101).

FIG. 8 is a table showing exemplary widget information of the translation-and-copying widget 21*c*. As shown in FIG. 8, the widget information of the translation-and-copying widget 21*c* includes a widget ID, a user ID, a widget address, a display name, and process flow information.

The widget ID is identification information for uniquely identifying the translation-and-copying widget 21*c*. The user ID is an identifier of the user of the translation-and-copying widget 21*c*. Thus, the widgets 21 are associated with the user (user ID) of the user terminal 20 where they are installed. The widget address is identification information (e.g., a URL) for uniquely identifying the translation-and-copying widget 21*c* in network communications. The display name is a character string to be displayed to represent the translation-and-copying widget 21*c*.

The process flow information includes a service name, a provider name, a URL, and configuration information for each service (a process to be performed) used in a process flow performed by the translation-and-copying widget 21*c*. The service name is an identifier of the corresponding service. In FIG. 8, the service names are written in English. However, the service names may instead be represented by any other codes that are suitable for processing by programs. The provider name is the name of a business providing the corresponding service. For example, the provider name "ABC" for the scanning service and the printing service indicates the manufacturer of the image forming apparatus 10. Meanwhile, the provider names for the OCR service and the translation service indicate businesses operating the OCR server 50 and the translation server 60. The URL is an identifier used by the provider application 1221 of the image forming apparatus 10 to identify the corresponding service on the network. Although URLs are used in this embodiment to identify services on the network, different types of identifiers may be used depending on the communication protocol employed. The configuration information includes parameters (execution conditions) for the corresponding service. For example, the configuration information for the scanning service may include parameters such as a resolution and a color mode. The configuration information for the OCR service may include parameters such as a document orientation (horizontal or vertical) and a language type. The configuration information for the translation service may include parameters such as a source language and a target language. The configuration information for the printing service may include parameters such as a paper size, a color mode, an N-up processing option, and a duplex printing option.

In this embodiment, the services are arranged in the process flow information in the order they are used. In the process flow of the translation-and-copying widget 21*c* shown in FIG. 8, the scanning service, the OCR service, the translation service, and the printing service are used (the corresponding processes are performed) in the order mentioned. Alternatively, services may be arranged in the process flow information regardless of the order they are used. In such a case, the process flow information may further include information indicating the order in which the services are used. Although the configuration of the widget information of the translation-and-copying widget 21*c* is described above as an example, widget information of other widgets 21 may have similar configurations.

The widget information is obtained from the attribute information management file 215. Therefore, the user can customize the configuration information of services by editing the attribute information management file 215.

Referring back to FIG. 7, the widget information registration unit 223 registers the received widget information in the widget information management table 227 corresponding to the user ID contained in the widget information (S102). If no widget information management table 227 corresponding to the user ID is found, the widget information registration unit 223 generates a widget information management table 227 for the user ID and registers the widget information in the generated table 227. In this embodiment, it is assumed that the user terminal 20 corresponds one-to-one to a user. Also, it is assumed that the widget information management table 227 is deleted when the widget manager 22 is terminated. Accordingly, in this embodiment, when a widget 21 is activated for the first time after the user terminal 20 is turned on, the widget information management table 227 is generated.

When the widget information management table 227 is newly generated, i.e., when widget information related to a user (user ID) is registered for the first time, the advertising unit 224 issues, on the network, an advertisement including the user ID contained in the widget information and a widget information URL (uniform resource locator) for obtaining the widget information. The widget information URL is unique to the widget manager 22 (i.e., to each user terminal 20).

Assuming that there are multiple image forming apparatuses 10, the advertisement is received by the user detection units 131 of the image forming apparatuses 10 that are ready to communicate with the user terminal 20. When receiving the advertisement, the user detection unit 131 of each image forming apparatus 10 registers the user ID and the widget information URL contained in the advertisement in the user management table 141 (S104).

FIG. 9 shows an exemplary configuration of the user management table 141. As shown in FIG. 9, the user management table 141 stores user IDs in association with widget information URLs. In this example, records for user A and user B are registered in the user management table 141.

Through the above process, the existence of the translation-and-copying widget 21*c* is recognized by the widget manager 22; and also, the existence of the user of the user terminal 20 is recognized by the image forming apparatus 10. As a result, the user can use the translation-and-copying widget 21*c* via the image forming apparatus 10. If the same user successively activates other widgets 21 such as the scanning widget 21*a* and the printing widget 21*b*, the widget information of those widgets 21 is also registered in the widget information management table 227. In this case, however, no advertisement is issued because the advertisement for the user has already been issued.

After the process of FIG. 7, the user moves to the location where the image forming apparatus 10 is installed to execute the translation-and-copying widget 21*c*. When there are multiple image forming apparatuses 10 that are ready to communicate with the user terminal 20, the user may select any one of them. In other words, the user can execute the translation-and-copying widget 21*c* using any one of the image forming apparatuses 10.

Figure 10:
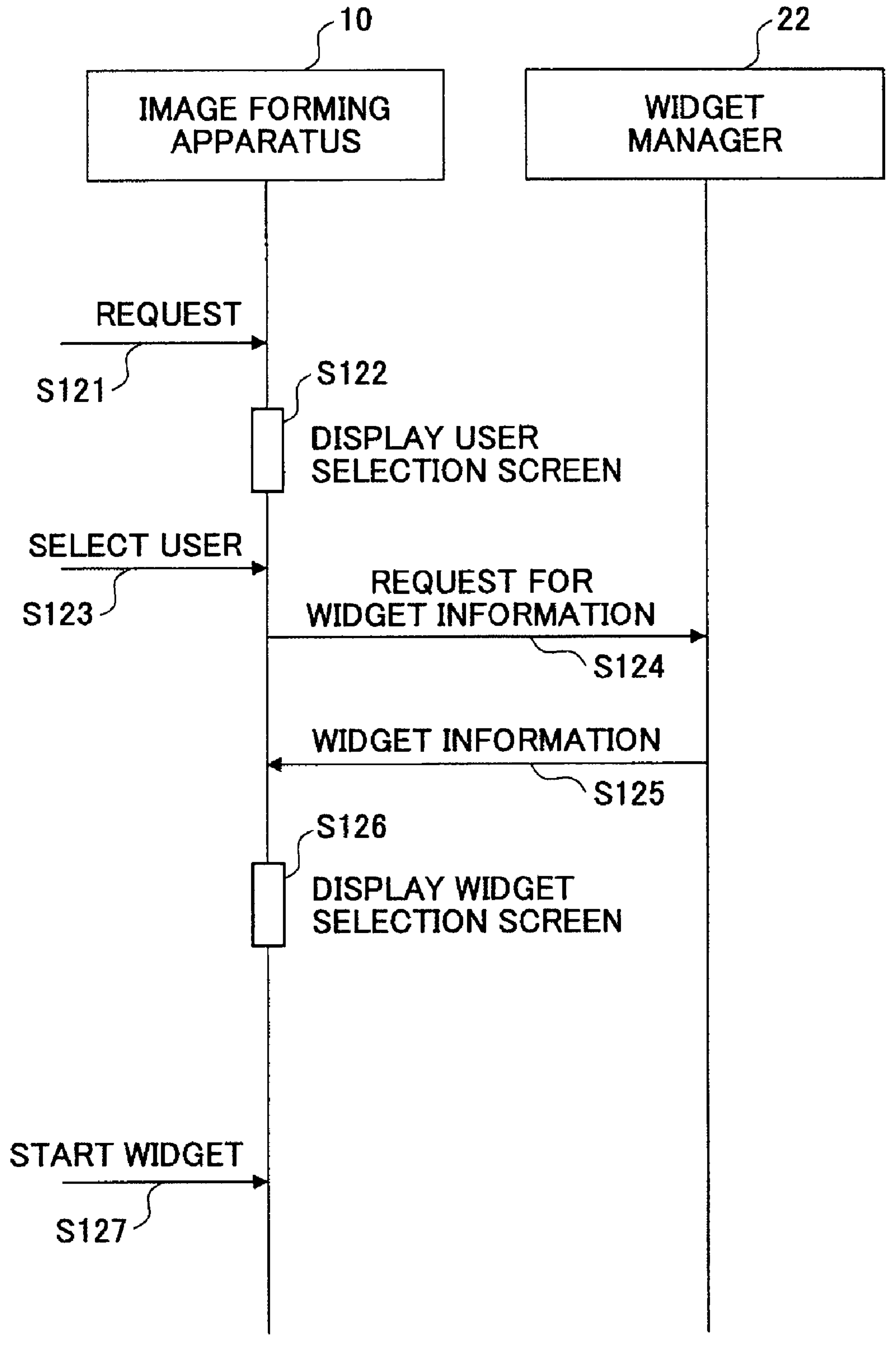
FIG. 10 is a sequence chart showing a process of selecting a widget to be executed.

Next, a process performed according to user operations at the image forming apparatus 10 is described. FIG. 10 is a sequence chart showing a process of selecting a widget to be executed.

When the user inputs a request to use the provider application 1221 via the operations panel 15 (S121), the UI control unit 132 of the provider application 1221 displays a user selection screen on the operations panel 15 based on information registered in the user management table 141 (S122). Alternatively, in step S122, the UI control unit 132 may be configured to obtain user information from the widget manager 22 and to display a user selection screen based on the obtained user information. In this case, it is not necessary to perform steps S103 and S104 of FIG. 7 in advance.

Figure 11:
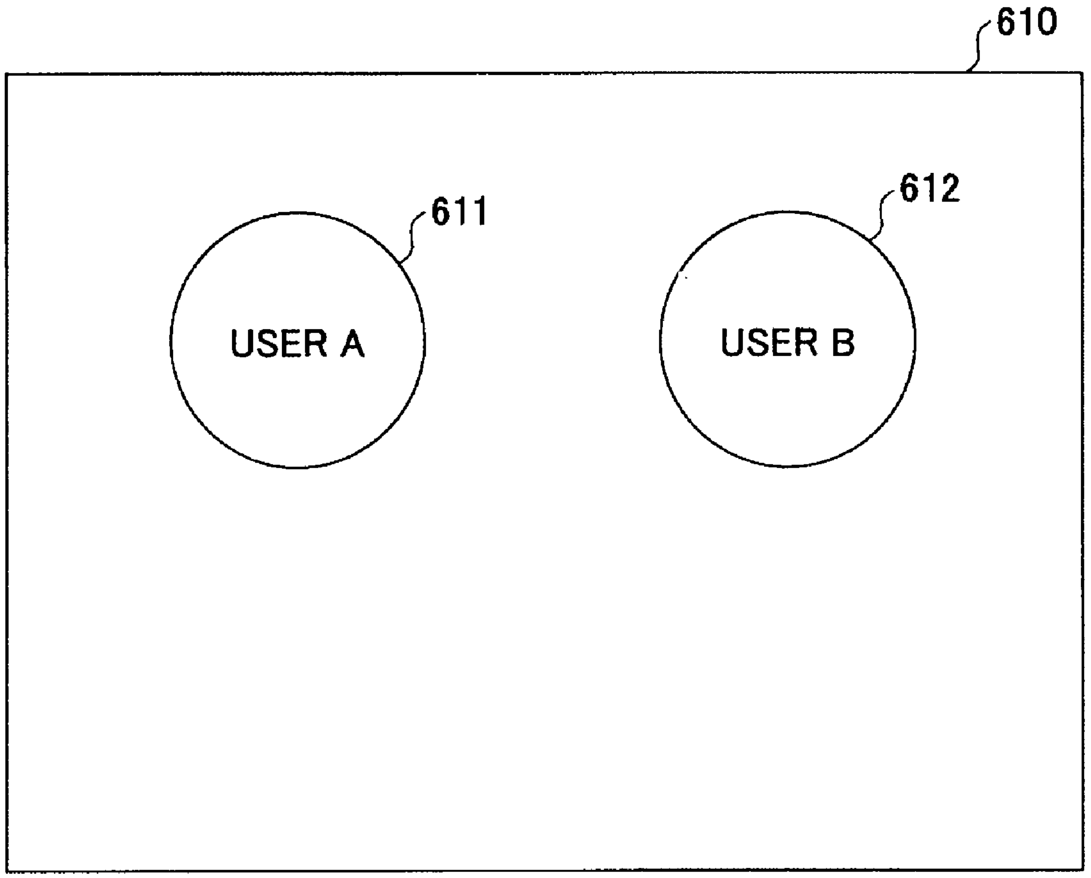
FIG. 11 is a drawing illustrating an exemplary user selection screen.

FIG. 11 is a drawing illustrating an exemplary user selection screen 610. The user selection screen 610 shown in FIG. 11 includes buttons for respective user IDs. In this example, a button 611 for user A and a button 612 for user B are shown in the user selection screen 610.

In the next step in FIG. 10, the user presses a button corresponding to its own user ID on the user selection screen 610 (S123). When the button is pressed, the widget information obtaining unit 133 retrieves from the user management table 141 a widget information URL corresponding to the user ID associated with the pressed button. Here, user authentication may be performed when a button corresponding to a user ID is pressed so that subsequent steps are performed only when the user is successfully authenticated.

Next, the widget information obtaining unit 133 transmits a request for obtaining widget information to the retrieved widget information URL (S124). The request for obtaining widget information transmitted to the widget information URL is received by the widget information providing unit 225 of the widget manager 22. The widget information providing unit 225 obtains sets of widget information of all widgets 21 registered in the widget information management table 227 and transmits the sets of widget information to the provider application 1221 (S125). In this step, the widget information providing unit 225 generates URLs (widget relay URLs) that are unique to the respective widgets 21 (or the respective sets of the widget information) and used to relay communications between the provider application 1221 and the widgets 21. The widget information providing unit 225 attaches the generated widget relay URLs to the sets of widget information of the widgets 21 and transmits the sets of widget information with the widget relay URLs to the provider application 1221. For example, each set of the widget information to be transmitted in step S125 has a configuration as shown in FIG. 12.

FIG. 12 is a table showing an exemplary configuration of the widget information of the translation-and-copying widget 21*c* to be transmitted from the widget manager 22 to the provider application 1221.

The widget information of FIG. 12 includes a widget relay URL in addition to items of the widget information shown in FIG. 8. In step S125, sets of widget information as shown in FIG. 12 are transmitted. Needless to say, there is a case where only one set of widget information is transmitted.

The widget relay URL may be generated and attached to widget information when the widget information is registered in the widget information management table 227.

Next, when the sets of widget information are received, the UI control unit 132 of the provider application 1221 stores the received sets of widget information in the RAM 112 and displays a screen (widget selection screen) including a list of widgets 21 available to the user (S126).

Figure 13:
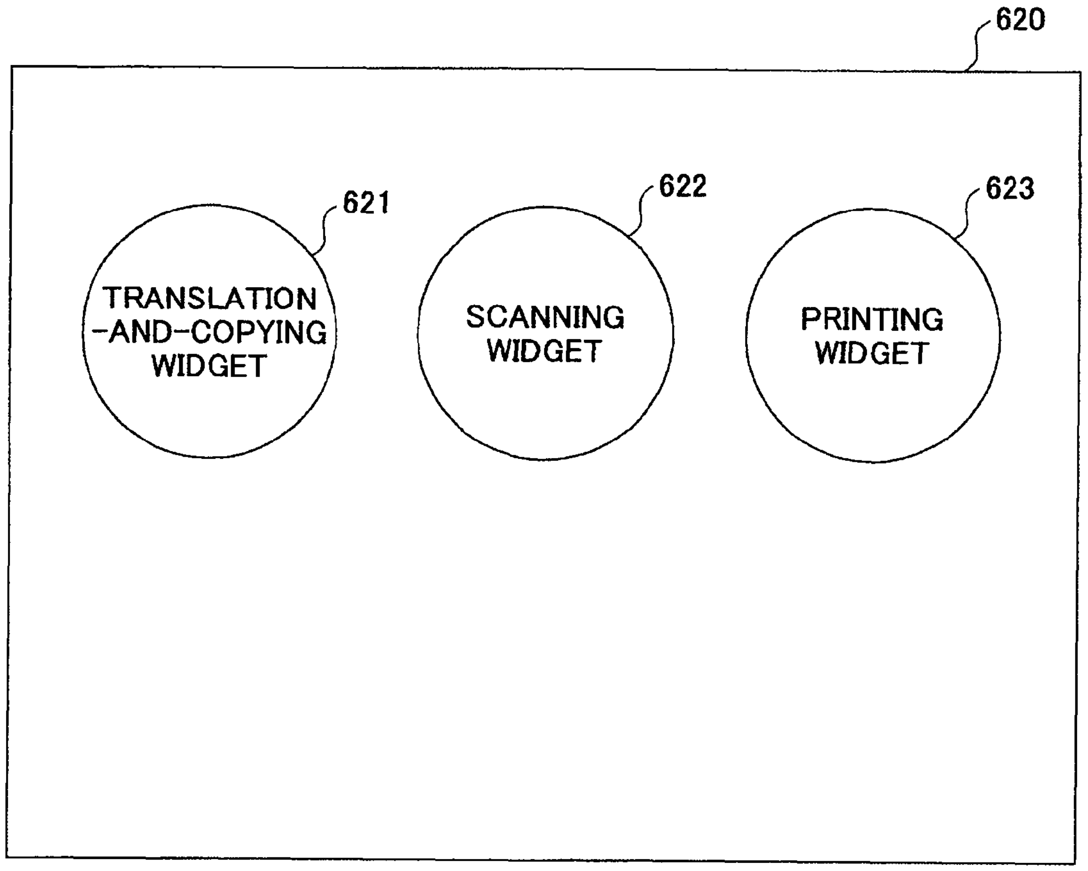
FIG. 13 is a drawing illustrating an exemplary widget selection screen.

FIG. 13 is a drawing illustrating an exemplary widget selection screen 620. The widget selection screen 620 shown in FIG. 13 includes buttons for respective widgets 21. In this example, a button 621 for the translation-and-copying widget 21*c*, a button 622 for the scanning widget 21*a*, and a button 623 for the printing widget 21*b* are shown in the widget selection screen 620.

If, for example, the button 621 for the translation-and-copying widget 21*c* is selected on the widget selection screen 620 and a start key on the operations panel 15 is pressed after setting a document on the scanner 12 (S127), the process flow of the translation-and-copying widget 21*c* is started.

Figure 14A:
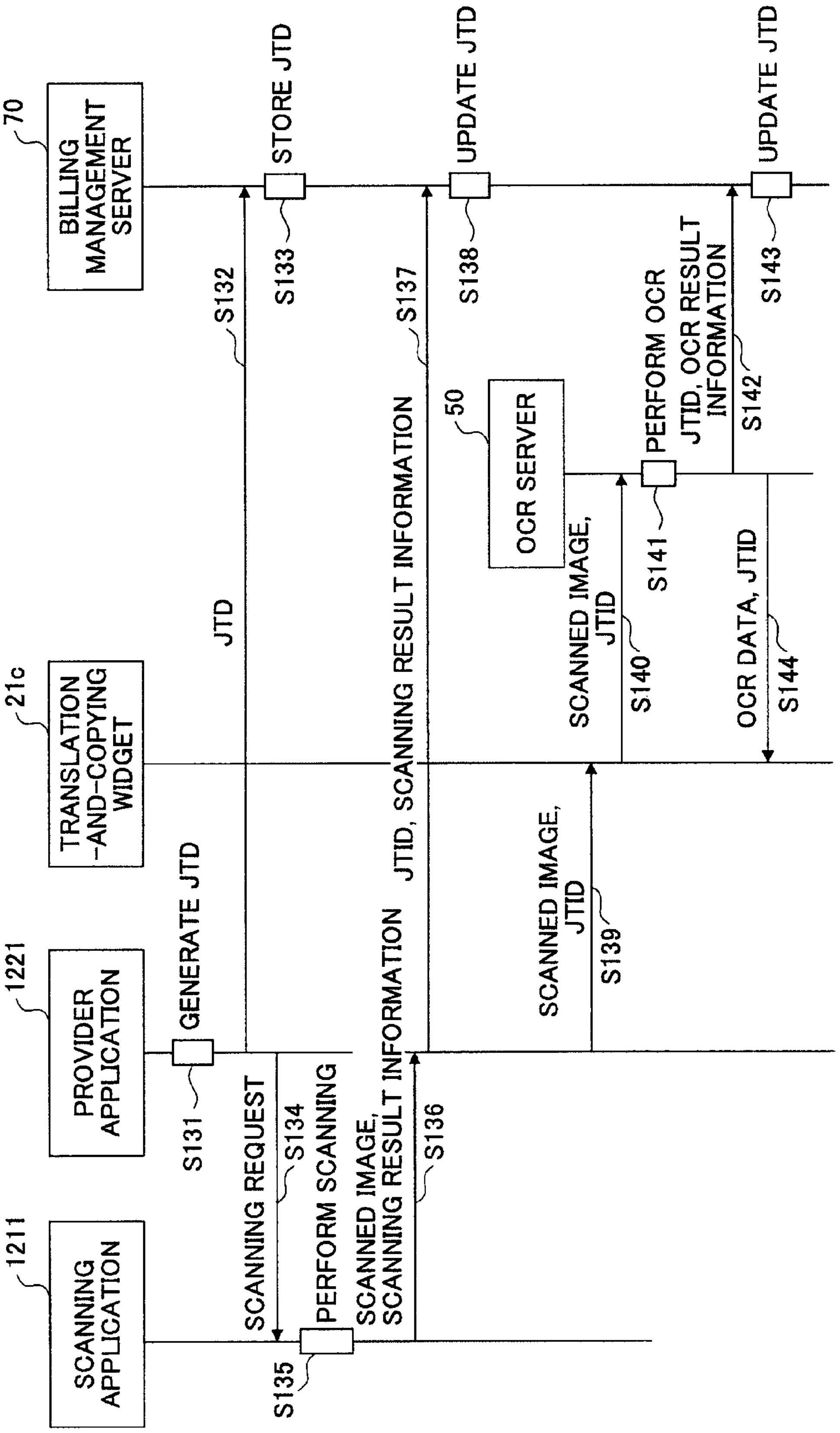
FIGS. 14A and 14B are sequence charts showing a procedure for executing a process flow of a translation-and-copying widget according to the first embodiment.
Figure 14B:
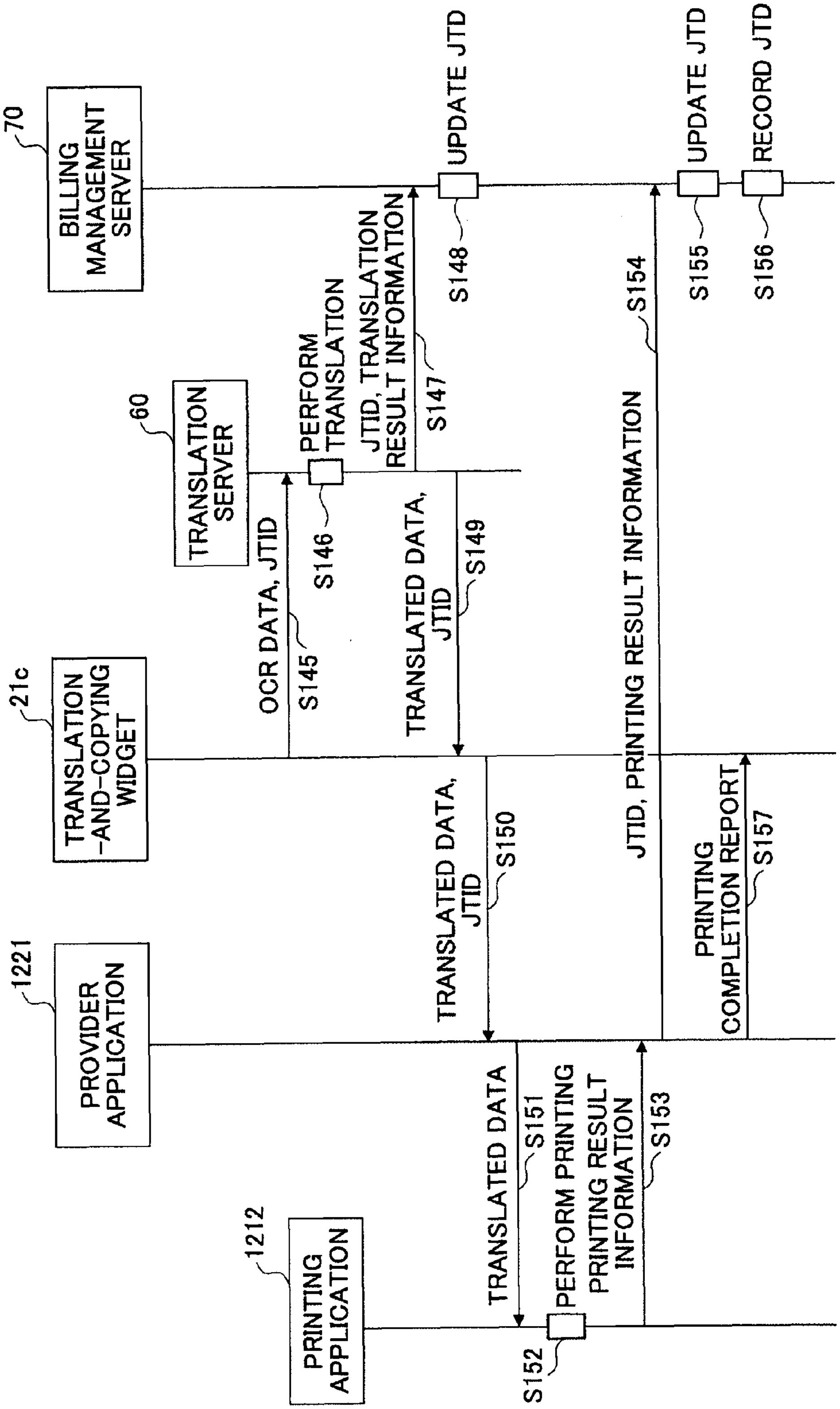

A procedure for executing the process flow of the translation-and-copying widget 21*c* is described below. FIGS. 14A and 14B are sequence charts showing a procedure for executing the process flow of the translation-and-copying widget 21*c* according to the first embodiment. Here, the procedure is divided into two FIGS. 14A and 14B simply because of space limitations.

When the translation-and-copying widget 21*c* is selected for execution, the job tracking data registration unit 134 of the provider application 1221 generates job tracking data (JTD) in the RAM 112 based on the widget information (hereafter called "current widget information") of the translation-and-copying widget 21*c* (S131).

FIG. 15 is a table showing an exemplary configuration of job tracking data. As shown in FIG. 15, the job tracking data include a job tracking ID and process flow information of the current widget information. The job tracking ID is identification information for uniquely identifying the job tracking data and is represented by, for example, a character string. When generating job tracking data, the job tracking data registration unit 134 determines a job tracking ID and assigns the job tracking ID to the job tracking data (i.e., records the job tracking ID in the job tracking data).

The job tracking data can also contain a charge count and a processing result for each service in the process flow information. The charge count indicates the amount of charge for the service. Instead, the charge count may be represented by the amount of money itself. The processing result indicates whether the service has been successfully completed or not. In FIG. 15, the charge counts and the processing results of all services are not recorded yet because none of the services has been performed. The job tracking data do not include the configuration information for the services. This is because the job tracking data are not used by servers (including the image forming apparatus 10) that provide the services according to the configuration information.

The job tracking data registration unit 134 records information associating the current widget information with the job tracking ID of the generated job tracking data in the RAM 112. For example, the job tracking data registration unit 134 records a pair of the widget ID of the current widget information and the job tracking ID in the RAM 112.

Next, the job tracking data registration unit 134 transmits the job tracking data to the billing management server 70 (S132). When receiving the job tracking data, the job tracking data receiving unit 71 of the billing management server 70 stores the received job tracking data in a temporary management area in the memory 703 (S133). Identification information (an IP address or a URL) of the billing management server 20 used to communicate with the billing management server 20 is stored, for example, in the HDD 114 of the image forming apparatus 10 in advance.

Next, the service control unit 138 of the provider application 1221 detects that the service name of the first entry (record) of the process flow information in the current widget information is "scanning" and no URL is specified for the first entry and therefore determines to request the scanning application 1211 to perform the scanning service. That is, if no URL is specified for an entry (or a service), the service control unit 138 determines that the service needs to be performed in the image forming apparatus 10 (i.e., the corresponding process is assigned to the image forming apparatus 10). In the above case, since the application for performing the scanning service in the image forming apparatus 10 is the scanning application 1211, the service control unit 138 determines to request the scanning application 1211 to perform the scanning service.

Then, the service control unit 138 inputs a request to perform a scanning process to the scanning application 1211 together with the configuration information for the scanning service contained in the current widget information (S134). The scanning application 1211 causes the scanner 12 to scan one page of a document according to the configuration information (S135). The scanning application 1211 outputs image data (scanned image) obtained by scanning the document and information (scanning result information) including a charge count for scanning one page of the document and a processing result of the scanning process to the service control unit 138 (S136).

The billing information transmitting unit 135 of the provider application 1221 transmits the scanning result information together with the job tracking ID (JTID) corresponding to the current widget information to the billing management server 70 (S137). The billing information receiving unit 72 of the billing management server 70 records the scanning result information in the job tracking data that are stored in the memory 703 and correspond to the received job tracking ID (S138). More specifically, the billing information receiving unit 72 updates the charge count and the processing result for the scanning service in the job tracking data based on the scanning result information.

Next, the service control unit 138 of the provider application 1221 detects that the service name of the second entry (record) of the process flow information in the current widget information is "OCR" and a URL is specified for the second entry and therefore determines to request an external Web service to perform the OCR service. Then, the data transfer unit 136 of the provider application 1221 transmits a scanning completion report including the scanned image and the job tracking ID to a widget relay URL contained in the current widget information (S139). The scanning completion report transmitted to the widget relay URL is received by the relay unit 226 of the widget manager 22. The relay unit 226 obtains widget information corresponding to the widget relay URL from the widget information management table 227 and transfers the scanning completion report to the widget address contained in the obtained widget information. The scanning completion report transmitted to the widget address is received by the logic unit 214 of the translation-and-copying widget 21*c*.

Thus, the data transfer unit 136 transfers data to the translation-and-copying widget 21*c* via the widget manager 22. In FIGS. 14A and 14B, however, the intermediation process performed by the widget manager 22 is omitted for brevity. Also, the intermediation process performed by the widget manager 22 is omitted in the descriptions below.

When receiving the scanning completion report, the logic unit 214 of the translation-and-copying widget 21*c* transmits a request to perform an OCR process on the scanned image to the OCR server 50 (S140). The request includes the scanned image and the job tracking ID contained in the scanning completion report and the configuration information for the OCR service. Here, it is assumed that the logic unit 214 of the translation-and-copying widget 21*c* has information regarding the process flow performed by the translation-and-copying widget 21*c*, the services used in the process flow, the configuration information for the services, and the locations (e.g., URLs) of servers providing the services. This information may be built into (or hard-coded in) the logic unit 214 as logic or may be dynamically obtained from the attribute information management file 215 of the translation-and-copying widget 21*c*.

The OCR server 50 performs an OCR process on the scanned image according to the received configuration information (S141). Then, the OCR server 50 transmits information (OCR result information) including a charge count for the OCR process and a processing result of the OCR process together with the job tracking ID to the billing management server 70 (S142). The identification information of the billing management server 70 used by the OCR server 50 to communicate with the billing management server 70 may be stored in advance in the OCR server 50 or may be transmitted from the provider application 1221 together with the scanned image and the job tracking ID. The same applies to the translation server 60.

The billing information receiving unit 72 of the billing management server 70 records the OCR result information in the job tracking data that are stored in the memory 703 and correspond to the received job tracking ID (S143). More specifically, the billing information receiving unit 72 updates the charge count and the processing result for the OCR service in the job tracking data based on the OCR result information.

Next, the OCR server 50 returns an OCR completion report including text data (OCR data) obtained by the OCR process and the job tracking ID to the translation-and-copying widget 21*c* (S144).

When receiving the OCR completion report, the logic unit 214 of the translation-and-copying widget 21*c* transmits a request to perform a translation process on the OCR data to the translation server 60 (S145). The request includes the OCR data, the job tracking ID, and the configuration information for the translation service.

The translation server 60 performs a translation process on the OCR data according to the received configuration information (S146). Then, the translation server 60 transmits information (translation result information) including a charge count for the translation process and a processing result of the translation process together with the job tracking ID to the billing management server 70 (S147). The billing information receiving unit 72 of the billing management server 70 records the translation result information in the job tracking data that are stored in the memory 703 and correspond to the received job tracking ID (S148). More specifically, the billing information receiving unit 72 updates the charge count and the processing result for the translation service in the job tracking data based on the translation result information.

Next, the translation server 60 returns a translation completion report including text data (translated data) obtained by the translation process and the job tracking ID to the translation-and-copying widget 21*c* (S149).

When receiving the translation completion report, the logic unit 214 of the translation-and-copying widget 21*c* transmits a request to perform a printing process on the translated data to the provider application 1221 of the image forming apparatus 10 (S150). The request includes the translated data and the job tracking ID. To be precise, the request from the translation-and-copying widget 21*c* is relayed by the relay unit 226 of the widget manager 22 to the provider application 1221. However, for brevity, the relaying process by the widget manager 22 is omitted in FIGS. 14A and 14B and the descriptions below.

When receiving the request for the printing process, the data receiving unit 137 of the provider application 1221 reports the request to the service control unit 138. The service control unit 138 inputs a request for printing to the printing application 1212 together with the translated data in the reported request and the configuration information for the printing service contained in the current widget information corresponding to the job tracking ID (S151). The printing application 1212 causes the printer 13 to print the translated data according to the configuration information (S152). Then, the printing application 1212 outputs information (printing result information) including a charge count for printing one page and a processing result of the printing process to the service control unit 138 and thereby reports the completion of the printing process to the service control unit 138 (S153).

The billing information transmitting unit 135 of the provider application 1221 transmits the printing result information together with the job tracking ID (JTID) corresponding to the current widget information to the billing management server 70 (S154). The billing information receiving unit 72 of the billing management server 70 records the printing result information in the job tracking data that are stored in the memory 703 and correspond to the received job tracking ID (S155). More specifically, the billing information receiving unit 72 updates the charge count and the processing result for the printing service in the job tracking data based on the printing result information.

After the processing results and the charge counts for all of the services in the job tracking data are recorded, the job tracking data fixing unit 73 of the billing management server 70 records the job tracking data in the job tracking data storing unit 74 (S156).

FIG. 16 is a table showing exemplary job tracking data where charge counts and execution results are recorded. In the job tracking data shown in FIG. 16, charge counts 1, 2, 5, and 1 are recorded, respectively, for the scanning service, the OCR service, the translation service, and the printing service. Also, "OK" is recorded as the processing result of each of the services. Recording the job tracking data in the job tracking data storing unit 74 indicates that the information (particularly, the charge counts) recorded in the job tracking data is fixed.

Next, the data transfer unit 136 of the provider application 1221 transmits a printing completion report to the translation-and-copying widget 21*c* (S157). When receiving the printing completion report, the logic unit 214 of the translation-and-copying widget 21*c* terminates the process flow.

The job tracking data recorded in the job tracking data storing unit 74 of the billing management server 70 are used as billing information for the corresponding user. Thus, the charge counts for all the services used by the translation-and-copying widget 21*c* are recorded in the job tracking data and integrally managed (or consolidated) by the billing management server 70. This in turn makes it possible to bill the user for all the services used by the translation-and-copying widget 21*c* with a single invoice based on the job tracking data. For example, a service person of the manufacturer of the image forming apparatus 10 may bill the user for all the services used based on the job tracking data. Thus, this embodiment makes it possible to allow the user to pay charges for all used services to a single business instead of paying the charges to separate service providers.

In this case, after receiving the payments for all the services used by the user, the manufacturer of the image forming apparatus 10 distributes the received money to other service providers (e.g., the operators of the OCR server 50 and the translation server 60) according to the charge counts recorded in the job tracking data. For such handling of payments, agreements may be made between the manufacturer of the image forming apparatus 10 and other service providers.

In the above configuration, information regarding charges (e.g., the charge counts and the processing results) is directly transmitted from the respective servers providing the services to the billing management server 70 without going through the widgets 21. This configuration makes it possible to reduce the possibility that the charge counts and the processing results are tampered with by an unauthorized widget 21 developed by a malicious developer, and thereby makes it possible to prevent a "free ride" on a service.

When a document includes multiple pages, as the easiest approach, steps S135 through S157 may be repeated (looped) for the number of pages (example 1). As another approach, the translation-and-copying widget 21*c* may be configured to buffer data of multiple pages so that only some of the steps are looped. For example, the translation-and-copying widget 21*c* may be configured to wait until steps S135 through S139 are performed for all pages and scanned images of all pages are received (example 2). In this case, in step S140, the translation-and-copying widget 21*c* transmits the scanned images of all the pages at once to the OCR server 50. Therefore, in processes (including OCR, translation, and printing) after step S140, the data of all pages are treated as a unit.

As still another approach, the translation-and-copying widget 21*c* may be configured to wait until steps S135 through S149 are performed for all pages and translated data of all pages are received (example 3). In this case, in step S150, the translation-and-copying widget 21*c* transmits the translated data of all pages at once to the provider application 1221. Therefore, in processes (including printing) after step S150, the data of all pages are treated as a unit.

Figure 17:
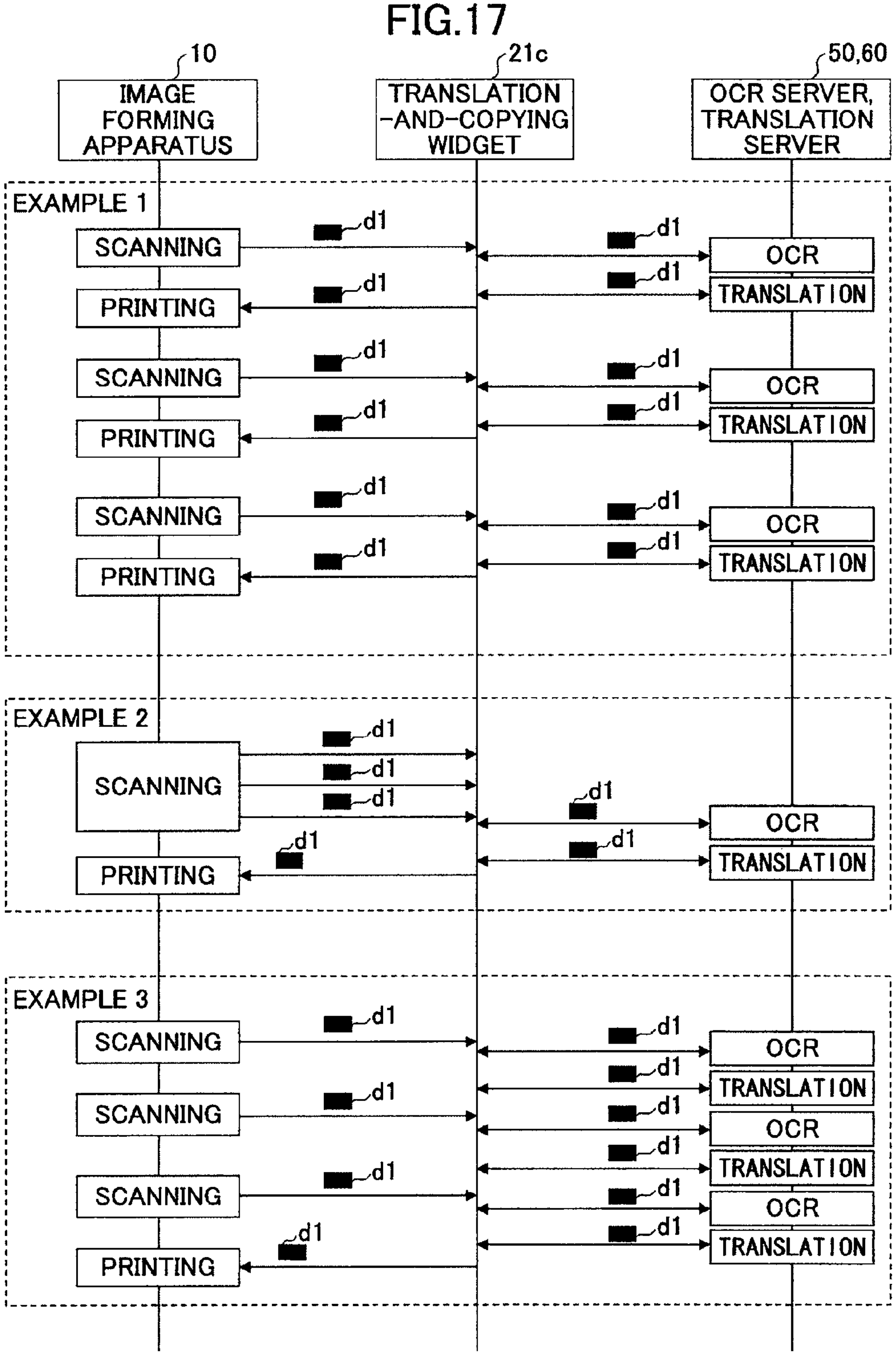
FIG. 17 is a drawing illustrating variations of a procedure for executing a process flow of a translation-and-copying widget.

Outlines of examples 1 through 3 described above are shown in FIG. 17. FIG. 17 is a drawing illustrating variations of the procedure for executing the process flow of the translation-and-copying widget 21*c* described above. In FIG. 17, for brevity, the OCR server 50 and the translation server 60 are shown on the same axis. Also in FIG. 17, d1 indicates a job tracking ID. The same job tracking ID is used throughout the procedure of each of the examples 1 through 3.

Let us assume a document includes three pages. In example 1, a process flow (or a loop) including scanning, OCR, translation, and printing is repeated three times. In all cycles of the loop, the same job tracking ID d1 is used. Accordingly, the charge counts and the processing results for the three pages are recorded in the same job tracking data.

In example 2, three pages of the document are scanned successively, the OCR and translation processes are performed on scanned images of the three pages, and translated data of the three pages are printed. In this case, one job tracking ID d1 is assigned to three sets (pages) of data in a request for the OCR process and a response to the request, in a request for the translation process and a response to the request, and in a request for the printing process. Accordingly, also in example 2, the charge counts and the processing results for the three pages are recorded in the same job tracking data.

In example 3, a process flow including scanning, OCR, and translation is repeated three times and translated data of the three pages are buffered by the translation-and-copying widget 21*c*. Then, the translated data of the three pages are printed. In this case, one job tracking ID d1 is assigned to three sets (pages) of translated data in a request for the printing process. Accordingly, also in example 3, the charge counts and the processing results for the three pages are recorded in the same job tracking data.

Figure 18:
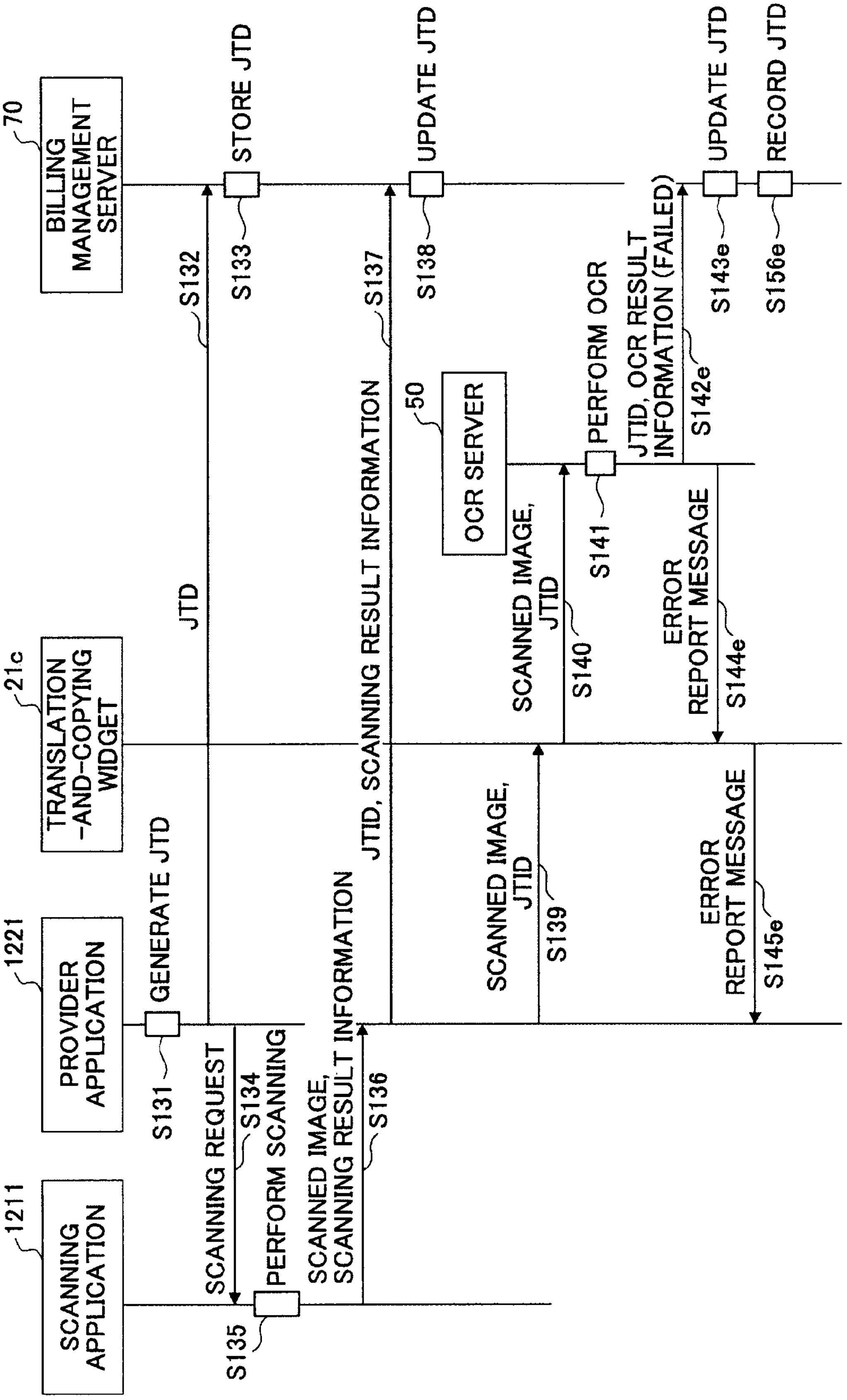
FIG. 18 is a sequence chart showing a procedure performed when an error occurs in a process flow of a translation-and-copying widget of the first embodiment.

Next, a case where an error occurs in a process flow is described. FIG. 18 is a sequence chart showing an exemplary procedure performed when an error occurs in the process flow of the translation-and-copying widget 21*c* of the first embodiment. The same step numbers as shown in FIGS. 14A and 14B are assigned to the corresponding steps in FIG. 18, and descriptions of those steps are omitted here.

In FIG. 18, it is assumed that an error has occurred in an OCR process (S141) by the OCR server 50. In this case, the OCR server 50 transmits OCR result information indicating that the OCR process has failed (an error has occurred) together with a job tracking ID to the billing management server 70 (S142*e*). The billing information receiving unit 72 of the billing management server 70 records the OCR result information in job tracking data that are stored in the memory 703 and correspond to the received job tracking ID (S143*e*). More specifically, the billing information receiving unit 72 records an error in the OCR service in the job tracking data.

FIG. 19 is a table showing exemplary job tracking data in a case where an error has occurred. In FIG. 19, "failed" is recorded as the processing result of the OCR service. In this example, no value is recorded for the charge count of the OCR service. Alternatively, "0" may be recorded for the charge count.

When an error occurs in the middle of the process flow, the job tracking data fixing unit 73 of the billing management server 70 records the job tracking data in the job tracking data storing unit 74 (S156$e$).

Meanwhile, the OCR server 50 returns an error report message including the job tracking ID to the translation-and-copying widget 21$c$ (S144$e$). When receiving the error report message, the logic unit 214 of the translation-and-copying widget 21$c$ cancels remaining processes, transfers the error report message including the job tracking ID to the provider application 1221, and thereby aborts the process flow (S145$e$). When the error report message is received by the data receiving unit 137 of the provider application 1221, the service control unit 138 recognizes that the process flow corresponding to the job tracking ID in the error report message has been aborted.

In the case of FIG. 18, the job tracking data are fixed as shown in FIG. 19. Even in this case, the user is charged for the scanning service. This is because the scanned image obtained by the scanning service has already been transmitted to the translation-and-copying widget 21$c$ and stored by the translation-and-copying widget 21$c$ in the user terminal 20. Since the scanned image has been made available to the user, it is reasonable to assume that the user has received the scanning service. Similarly, even if an error occurs in the translation service or the printing service, the user is charged for services that have been completed before the occurrence of the error.

Also in a case where a document with multiple pages is processed, the user is charged for services performed before the occurrence of an error.

Figure 20:
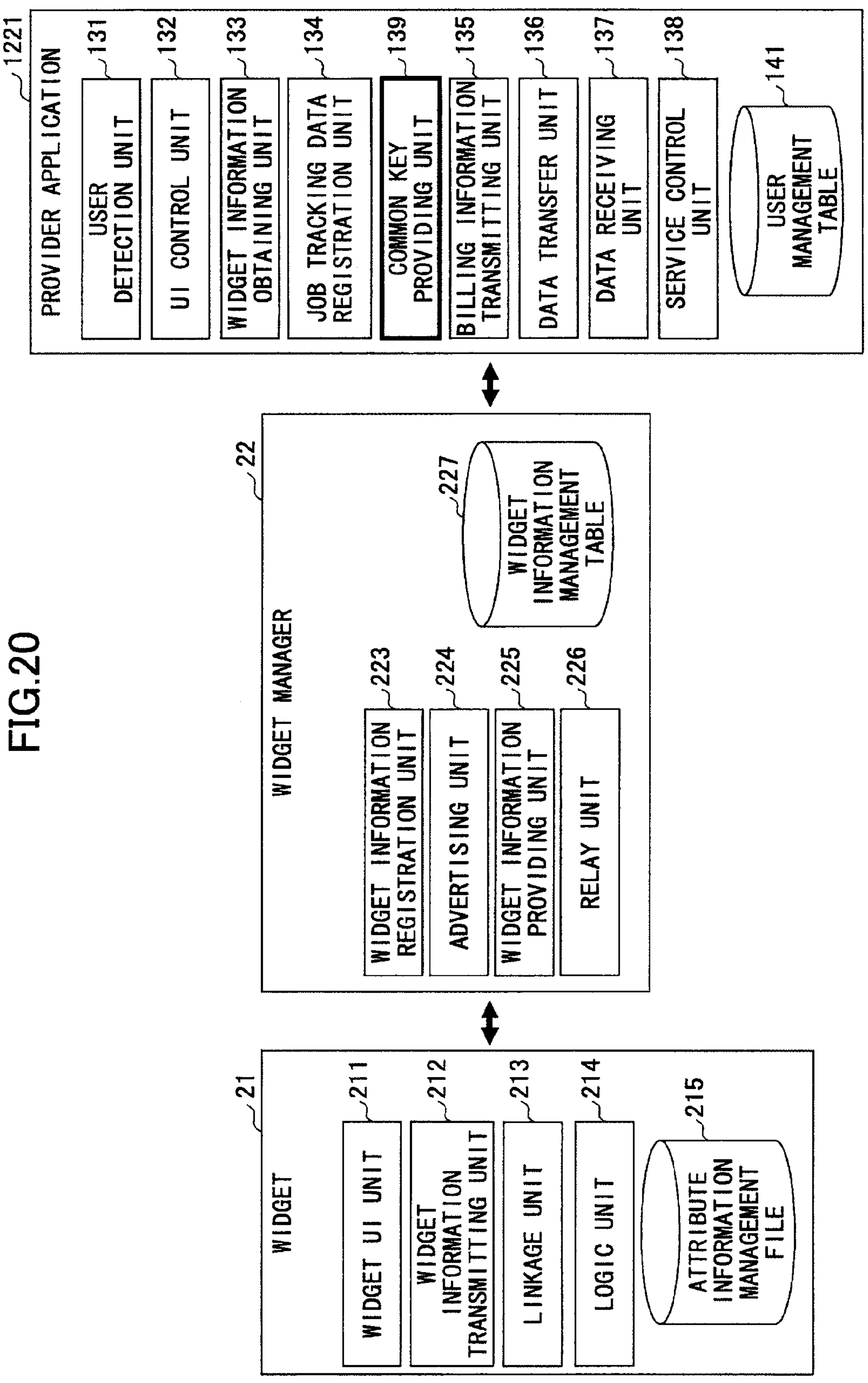
FIG. 20 is a block diagram illustrating exemplary functional configurations of a widget, a widget manager, and a provider application according to a second embodiment of the present invention.

A second embodiment of the present invention is described below. FIG. 20 is a block diagram illustrating exemplary functional configurations of the widget 21, the widget manager 22, and the provider application 1221 according to the second embodiment of the present invention. The same reference numbers as those shown in FIG. 4 are assigned to the corresponding components in FIG. 20, and descriptions of those components are omitted.

In FIG. 20, the provider application 1221 further includes a common key providing unit 139. The common key providing unit 139 generates an encryption key (a common key or a private key) used to encrypt data such as output data of a service and job tracking data. Also, the common key providing unit 139 securely transmits the generated common key, for example, to the OCR server 50, the translation server 60, and the billing management server 70.

Figure 21:
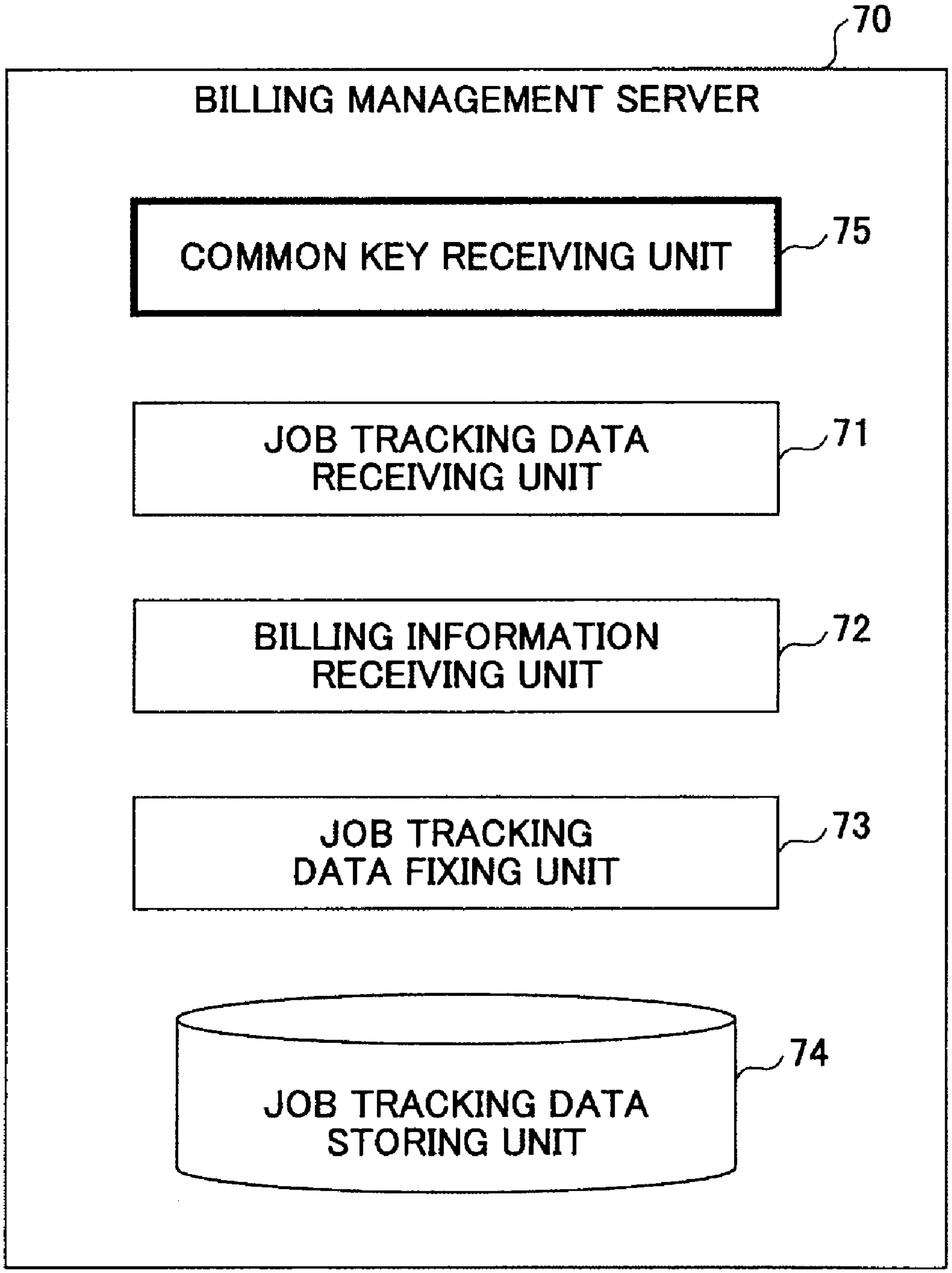
FIG. 21 is a block diagram illustrating an exemplary functional configuration of a billing management server according to the second embodiment.

FIG. 21 is a block diagram illustrating an exemplary functional configuration of the billing management server 70 according to the second embodiment. The same reference numbers as those shown in FIG. 6 are assigned to the corresponding components in FIG. 21, and descriptions of those components are omitted.

In FIG. 21, the billing management server 70 further includes a common key receiving unit 75. The common key receiving unit receives the common key transmitted from the common key providing unit 139 of the provider application 1221.

Exemplary processes in the information processing system 1 according to the second embodiment are described below. Here, differences between the first embodiment and the second embodiment are mainly described and descriptions in the first embodiment may also apply to the second embodiment unless otherwise mentioned.

Figure 22A:
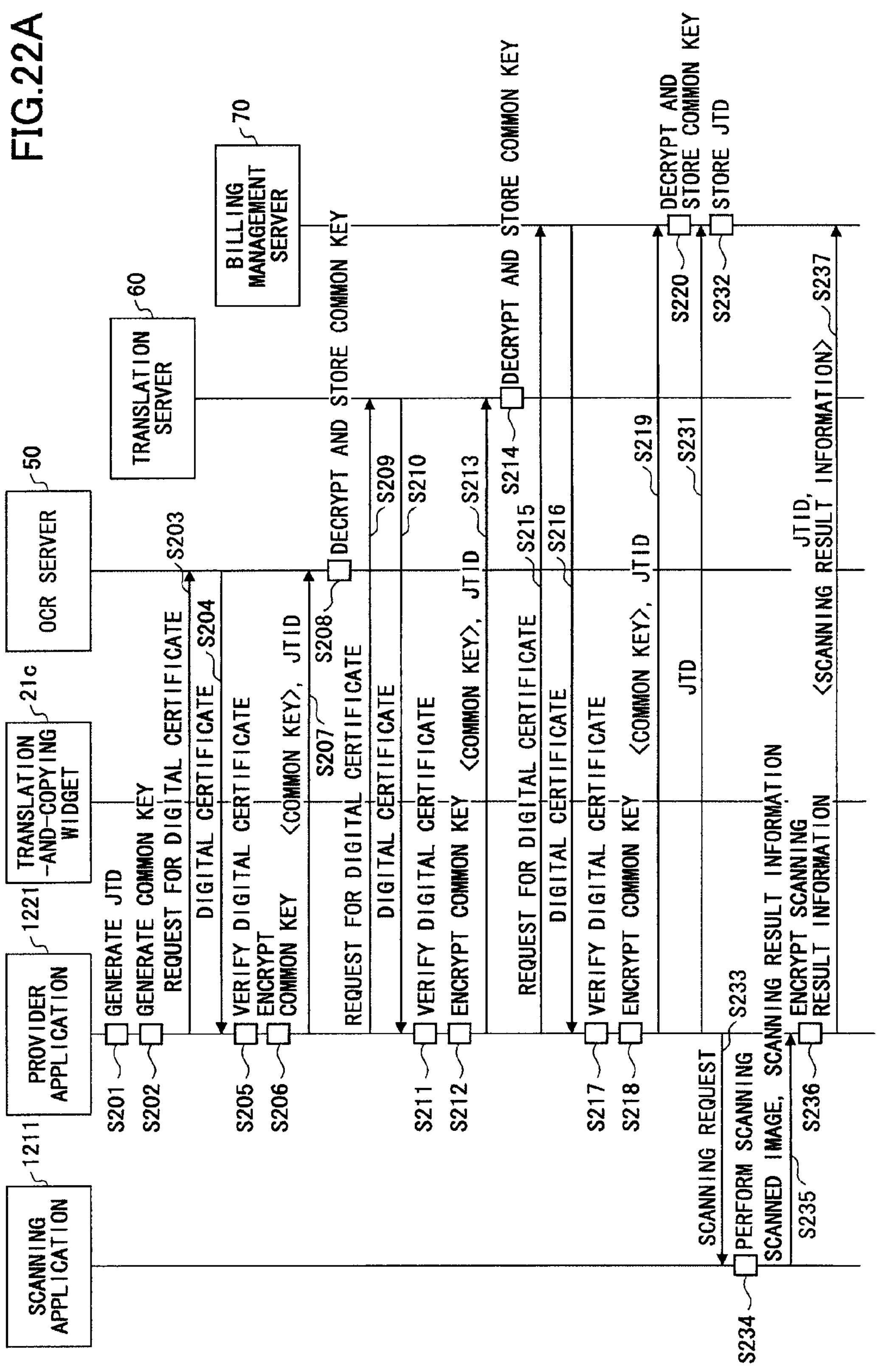
FIGS. 22A and 22B are sequence charts showing a procedure for executing a process flow of a translation-and-copying widget of the second embodiment.
Figure 22B:
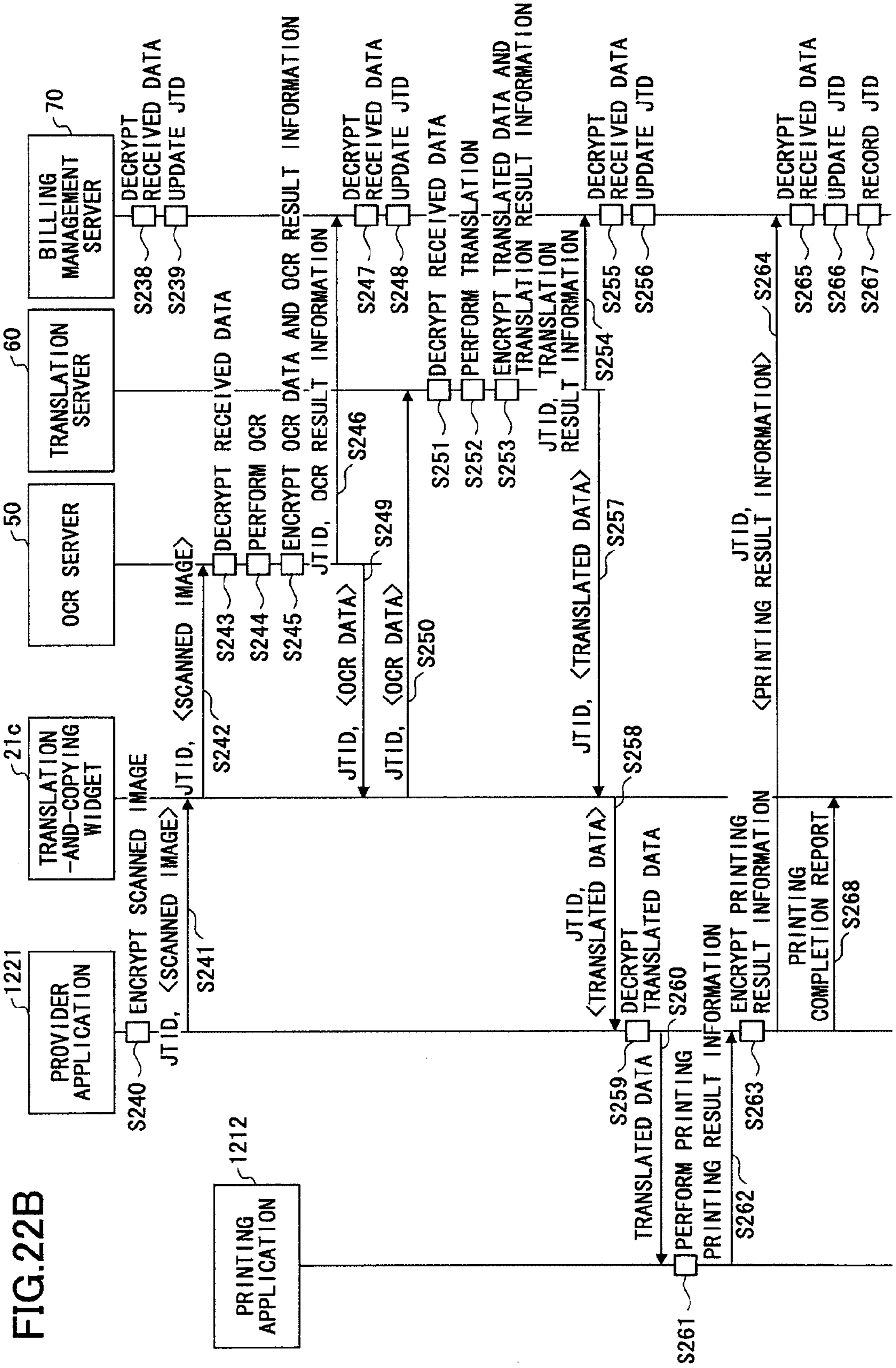

FIGS. 22A and 22B are sequence charts showing a procedure for executing the process flow of the translation-and-copying widget 21$c$ according to the second embodiment. Here, the procedure is divided into two FIGS. 22A and 22B simply because of space limitations. In the second embodiment, the procedure as shown in FIGS. 22A and 22B is performed instead of the procedure shown in FIGS. 14A and 14B.

In step S201, similarly to step S131 of FIG. 14A, the job tracking data registration unit 134 of the provider application 1221 generates job tracking data (JTD) in the RAM 112. Next, the common key providing unit 139 of the provider application 1221 generates, in the RAM 112, an encryption key (hereafter called a common key A) for encrypting data transmitted via the network, and associates the common key A with the job tracking ID (S202). Any algorithm may be used to generate the common key A. For example, a random number generated by a random number generator may be used as the common key A.

Following step S202, the common key providing unit 139 requests the OCR server 50, the translation server 60, and the billing management server 70 to transmit their digital certificates based on the URLs of the servers in the job tracking data and the identification information of the billing management server 70 prerecorded in the HDD 114 (S203, S209, S215). The digital certificates are issued by a certificate authority (CA). When receiving the digital certificates from the OCR server 50, the translation server 60, and the billing management server 70 (S204, S210, S216), the common key providing unit 139 verifies the received digital certificates (S205, S211, S217). Verification of the digital certificates may be performed by any known method. After successfully verifying the digital certificates, the common key providing unit 139 encrypts the common key A using public keys contained in the digital certificates (S206, S212, S218). Then, the common key providing unit 139 transmits the encrypted common key A together with the job tracking ID (JTID) to the OCR server 50, the translation server 60, and the billing management server 70 (S207, S213, S219). In FIGS. 22A and 22B, brackets < > indicate encrypted data items. For example, <common key> at steps S207, S213, and S219 indicates the encrypted common key A.

Each of the OCR server 50, the translation server 60, and the billing management server 70 decrypts the encrypted common key A using its own secret key and stores the decrypted common key A in a storage unit in association with the job tracking ID received together with the common key A (S208, S214, S220). In steps S215 through S220, processing performed at the billing management server 70 is controlled by the common key receiving unit 75. The common key receiving unit 75 stores the received common key A in the memory 703 in association with the job tracking ID.

Through the above steps, the common key A is securely shared by the image forming apparatus 10, the OCR server 50, the translation server 60, and the billing management server 70.

Next, similarly to step S132 of FIG. 14A, the job tracking data registration unit 134 of the provider application 1221 transmits the job tracking data to the billing management server 70 (S231). When receiving the job tracking data, the job tracking data receiving unit 71 of the billing management server 70 stores the received job tracking data in a temporary management area in the memory 703 (S232).

Next, similarly to step S134 of FIG. 14A, the service control unit 138 of the provider application 1221 inputs a request to perform a scanning process to the scanning application 1211 (S233). The scanning application 1211 causes the scanner 12 to scan a document in a manner similar to step S135 of FIG. 14A (S234), and outputs a scanned image and scanning result information including a charge count and a processing result to the service control unit 138 (S235).

Next, the billing information transmitting unit 135 of the provider application 1221 encrypts the scanning result information using the common key A (S236). Then, the billing information transmitting unit 135 transmits the encrypted scanning result information together with the job tracking ID (JTID) corresponding to the current widget information to the billing management server 70 (S237). The billing information receiving unit 72 of the billing management server 70 decrypts the scanning result information using the common key A corresponding to the received job tracking ID (S238). Next, the billing information receiving unit 72 records the decrypted scanning result information in the job tracking data corresponding to the received job tracking ID (S239).

Meanwhile, the data transfer unit 136 of the provider application 1221 encrypts the scanned image using the common key A (S240). Then, the data transfer unit 136 transmits a scanning completion report including the encrypted scanned image and the job tracking ID to the translation-and-copying widget 21*c* (S241). When receiving the scanning completion report, the logic unit 214 of the translation-and-copying widget 21*c* transmits a request to perform an OCR process to the OCR server 50 (S242). The request includes the encrypted scanned image and the job tracking ID contained in the scanning completion report.

In response, the OCR server 50 identifies the common key A for decrypting the scanned image based on the received job tracking ID and decrypts the scanned image using the identified common key A (S243). Next, the OCR server 50 performs an OCR process on the decrypted scanned image (S244), and encrypts obtained OCR data and OCR result information using the common key A (S245). Then, the OCR server 50 transmits the encrypted OCR result information together with the job tracking ID to the billing management server 70 (S246). The billing information receiving unit 72 of the billing management server 70 decrypts the OCR result information using the common key A corresponding to the received job tracking ID (S247). Next, the billing information receiving unit 72 records the decrypted OCR result information in the job tracking data corresponding to the received job tracking ID (S248).

The OCR server 50 also returns an OCR completion report including the encrypted OCR data and the job tracking ID to the translation-and-copying widget 21*c* (S249). When receiving the OCR completion report, the logic unit 214 of the translation-and-copying widget 21*c* transmits a request to perform a translation process on the OCR data to the translation server 60 (S250). The request includes the job tracking ID and the encrypted OCR data contained in the OCR completion report.

In response, the translation server 60 identifies the common key A for decrypting the OCR data based on the received job tracking ID and decrypts the OCR data using the identified common key A (S251). The translation server 60 performs a translation process on the decrypted OCR data (S252). Next, the translation server 60 encrypts translated data and translation result information using the common key A (S253). Then, the OCR server 60 transmits the encrypted translation result information together with the job tracking ID to the billing management server 70 (S254). The billing information receiving unit 72 of the billing management server 70 decrypts the translation result information using the common key A corresponding to the received job tracking ID (S255). Next, the billing information receiving unit 72 records the decrypted translation result information in the job tracking data corresponding to the received job tracking ID (S256).

The translation server 60 also returns a translation completion report including the encrypted translated data and the job tracking ID to the translation-and-copying widget 21*c* (S257). When receiving the translation completion report, the logic unit 214 of the translation-and-copying widget 21*c* transmits a request to perform a printing process on the translated data to the provider application 1221 of the image forming apparatus 10 (S258). The request includes the job tracking ID and the encrypted translated data.

When receiving the request to perform the printing process, the data receiving unit 137 of the provider application 1221 identifies the common key A for decrypting the translated data based on the job tracking ID in the request and decrypts the translated data using the identified common key A (S259). Then, the data receiving unit 137 inputs a request for printing including the decrypted translated data to the service control unit 138.

Steps S260 through S262 are substantially the same as steps S151 through S153 of FIG. 14B. Following step S262, the billing information transmitting unit 135 of the provider application 1221 encrypts printing result information using the common key A (S263). Then, the billing information transmitting unit 135 transmits the encrypted printing result information together with the job tracking ID corresponding to the current widget information to the billing management server 70 (S264). The billing information receiving unit 72 of the billing management server 70 decrypts the printing result information using the common key A corresponding to the received job tracking ID (S265). Next, the billing information receiving unit 72 records the decrypted printing result information in the job tracking data corresponding to the received job tracking ID (S266). Then, similarly to step S156 of FIG. 14B, the job tracking data fixing unit 73 of the billing management server 70 records the job tracking data in the job tracking data storing unit 74 (S267).

Meanwhile, the data transfer unit 136 of the provider application 1221 transmits a printing completion report to the translation-and-copying widget 21*c* (S268). When receiving the printing completion report, the logic unit 214 of the translation-and-copying widget 21*c* terminates the process flow.

Encrypting intermediate data (such as a scanned image, OCR data, and translated data) before transmission as described above makes it possible to prevent leakage of the intermediate data (document information) by an unauthorized widget. Here, the "unauthorized widget" indicates, for example, a widget 21 that is developed by a malicious Web service provider and can be downloaded from the network. Such an unauthorized widget may be configured to leak the intermediate data to a malicious Web service. Compared with plaintext data, encrypted data provides higher security even if the data are leaked by an unauthorized widget.

In step S268, the data transfer unit 136 may be configured to transmit the common key A together with the printing completion report to the translation-and-copying widget 21*c*. This enables the translation-and-copying widget 21*c* to decrypt intermediate data, such as a scanned image, OCR data, and translated data, retained at the translation-and-copying widget 21*c* by using the common key A. In this case, the provider application 1221 may be configured to receive a digital certificate from the translation-and-copying widget 21*c* and to transmit the common key A to the translation-and-copying widget 21*c* if the digital certificate is successfully verified. Also, the provider application 1221 may be configured to encrypt the common key A using a public key in the received digital certificate to securely transmit the common key A.

Alternatively, the provider application 1221 may be configured to transmit the common key A to the widget manager 22 that is more reliable than the widget 21. In this case, using the common key A, the widget manager 22 decrypts intermediate data stored, for example, in a folder by the translation-and-copying widget 21*c*.

A procedure involving encryption of intermediate data as shown in FIGS. 22A and 22B may also be modified in a manner similar to FIG. 18 when an error occurs in the middle of a process flow. In this case, if an error report message is received as in step S145*e* of FIG. 18, the provider application 1221 is preferably configured to not transmit the common key A to the translation-and-copying widget 21*c*. This is because if an error occurs in a procedure involving encryption of intermediate data, it is highly likely that an unauthorized process has been performed. For example, there is a case where intermediate data are tampered with by a (unauthorized) translation-and-copying widget 21*c* or by an unauthorized Web service used by the translation-and-copying widget 21*c* and at a later stage, the intermediate data cannot be successfully decrypted by an authorized service. Also, there is a case where an unauthorized process by an unauthorized widget fails and results in an error because intermediate data are encrypted. Further, there is a case where an unauthorized widget intentionally causes an error to evade payment of charges. For example, if the billing management server 70 is configured to nullify all charge counts recorded in a process flow in a procedure involving encryption of intermediate data when an error occurs in the process flow, it is possible to evade payment of charges by intentionally causing an error.

As described above, if the provider application 1221 is configured to not transmit the common key A to the widget 21 when an error occurs in a process flow in a procedure involving encryption of intermediate data, the billing management server 70 may be configured to nullify all charge counts recorded in the process flow. This is because if the common key A is not transmitted to the widget 21, the user cannot decrypt and use the intermediate data. That is, it is unreasonable to assume that the user has received services provided before the occurrence of an error and therefore it is unreasonable to charge for the services.

For the above reasons, when receiving result information indicating an error as in step S142*e* of FIG. 18, the billing information receiving unit 72 of the billing management server 70 records "failed" in the job tracking data as the processing result of the corresponding service and nullifies all charge counts of other services that have been recorded in the job tracking data. For example, the billing information receiving unit 72 resets the recorded charge counts to "0" or clears the recorded charge counts so that the user will not be charged for the services.

FIG. 23 is a table showing exemplary job tracking data where charge counts are nullified. Here, it is assumed that an error has occurred in an OCR process after a scanning process has been successfully completed. In the job tracking data shown in FIG. 23, the charge count "1" for the scanning service has been reset to "0".

After an error occurs and the charge count(s) is nullified by the billing information receiving unit 72, the job tracking data fixing unit 73 records the job tracking data in the job tracking data storing unit 74. As a result, the charge count(s) is fixed as exemplified in FIG. 23.

Instead of autonomously nullifying a charge count(s), the billing information receiving unit 72 may be configured to nullify a charge count(s) in response to a request from the provider application 1221 that has received an error report message. In this case, when receiving an error report message as in step S145*e* of FIG. 18, the billing information transmitting unit 135 of the provider application 1221 transmits a charge-count nullification request together with a job tracking ID to the billing management server 70. When receiving the nullification request, the billing information receiving unit 72 of the billing management server 70 nullifies a charge count(s) in the job tracking data corresponding to the received job tracking ID.

By the way, the processing load for encryption and decryption may become high depending on the encryption method used. Therefore, when a document including multiple pages is to be processed, encrypting all the pages may degrade the performance. Meanwhile, it is highly likely that technologies such as secure socket layer (SSL) and IPSec are employed as the network infrastructure to enhance the security of network communications between the widgets 21 and the servers providing services. With such a network infrastructure, it may be redundant to employ common key cryptography also at the application level.

For these reasons, when a document includes multiple pages (when there are multiple sets of data to be processed), only some (one or more) of the pages (or some of the sets of data) may be encrypted. For example, when the number of pages is small (less than a predetermined value), only the first page may be encrypted; or when the number of pages is large (greater than or equal to the predetermined value), the pages may be encrypted at intervals.

Even when only some of the pages are encrypted, charge counts are handled in substantially the same manner as described above when an error occurs in a process flow employing encryption (hereafter called an "authentication flow"). That is, all charge counts recorded in job tracking data corresponding to the process flow are nullified. Here, a process flow employing encryption is called an "authentication flow" because encrypting data also makes it possible to check the validity of processes in the process flow, i.e., to authenticate the process flow. Accordingly, encrypting pages at intervals makes it possible to authenticate the process flow at intervals and thereby to improve the security.

Meanwhile, charge counts are handled in substantially the same manner as described in the first embodiment when an error occurs in a process flow not employing encryption (hereafter called a plaintext flow). That is, the user is charged for services successfully completed. The reasons for charging for successfully completed services are already described in the first embodiment. An additional reason is that an error in a plaintext flow is often caused by a problem at the user side. Examples of problems at the user side include a case where the widget 21 is configured to perform a process that intentionally causes an error in a plaintext flow and deterioration in network communication conditions.

For the above reasons, the job tracking data registration unit 134 is preferably configured to generate new job tracking data when an authentication flow and a plaintext flow are switched and to register the new job tracking data in the billing management server 70. This configuration makes it possible to easily identify charge counts to be nullified when an error occurs in an authentication flow. In this case, since charge counts received together with the same job tracking ID are recorded in the same job tracking data, the billing information receiving unit 72 may be configured to nullify all charge counts in job tracking data corresponding to a job tracking ID received together with result information indicating an error in an authentication flow.

Considering the difference between an authentication flow and a plaintext flow in handling charge counts when an error occurs, it is preferable to process one page or a small number of pages (that is less than a predetermined value) at once in an authentication flow. Even if an error is intentionally generated in an authentication flow to nullify all charge counts and thereby to evade payment of charges, limiting the number of pages to be processed at once in the authentication flow makes it possible to minimize the resulting loss.

Meanwhile, a large number of pages (that is greater than a predetermined value) are preferably processed at once in a plaintext flow. In a plaintext flow, since the user is charged for successfully completed services even when an error occurs, it is unlikely that payment of charges can be evaded. Also, processing a large number of pages at once in a process flow makes it possible to improve the efficiency.

Figure 24:
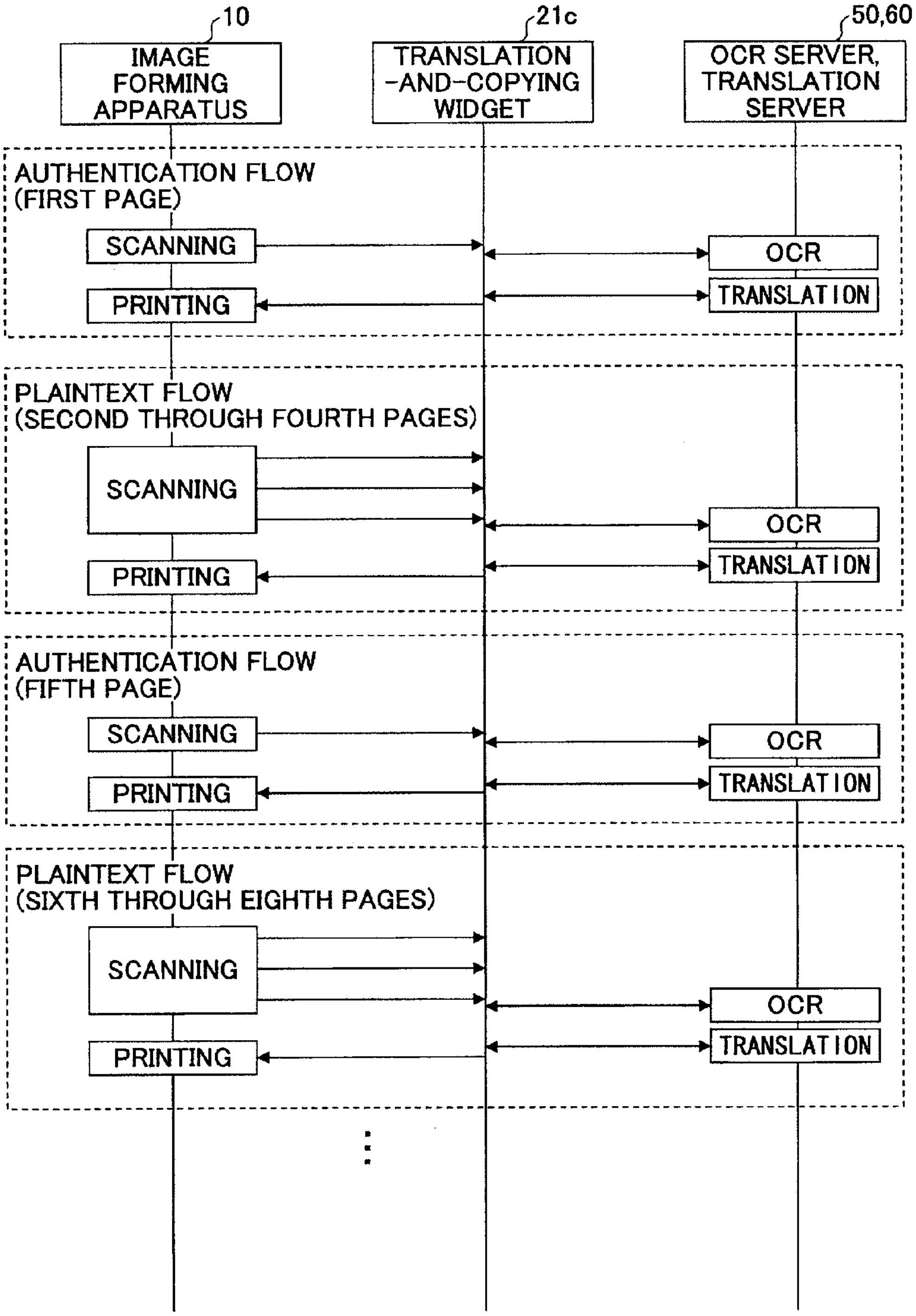
FIG. 24 is a sequence chart showing an exemplary combination of an authentication flow and a plaintext flow.

As shown in FIG. 24, an authentication flow and a plaintext flow may be combined. FIG. 24 is a sequence chart showing an exemplary combination of an authentication flow and a plaintext flow.

In FIG. 24, an authentication flow based on example 1 of FIG. 17 is performed for each of the first and fifth pages and a plaintext flow based on example 2 of FIG. 17 is performed for each set of three pages, the second through fourth pages and the sixth through eighth pages.

Alternatively, the plaintext flow may be based on example 3 of FIG. 17. Also, the plaintext flow may be performed by repeating the loop of example 1 for the number of pages. Similarly, the authentication flow may be based on example 2 or example 3 of FIG. 17. Even in this case, however, the number of pages to be processed at once in the authentication flow is preferably small.

Pages (or data) to be processed in the authentication flow may be selected by the data transfer unit 136 of the provider application 1221. The authentication flow may be performed either regularly or randomly. Randomly performing the authentication flow makes it difficult for an unauthorized widget to detect the process pattern.

When the authentication flow is to be performed randomly, the common key providing unit 139 may be configured to transmit, in addition to a common key, information (encryption page information) indicating pages to be encrypted to the OCR server 50 and the translation server 60. However, the encryption page information may not necessarily be reported in advance. For example, the OCR server 50 and the translation server 60 may be configured to determine whether received intermediate data are encrypted by analyzing a part of the intermediate data and to decrypt the intermediate data using a common key if the intermediate data are encrypted.

In a case where a common key is transmitted to the widget 21 when an authentication flow is completed, the common key providing unit 139 may be configured to update the common key (or generates a new common key) in the next authentication flow and to transmit the updated common key to the OCR server 50 and the translation server 60. This configuration makes it possible to encrypt intermediate data using a different common key for each authentication flow. For example, the data transfer unit 135 encrypts a scanned image using a different common key for each authentication flow; the OCR server 50 encrypts OCR data using a different common key for each authentication flow; and the translation server encrypts translated data using a different common key for each authentication flow. Taking FIG. 24 as an example, this configuration makes it possible to prevent the translation-and-copying widget 21*c* from performing an unauthorized process on intermediate data of the fifth page using a common key provided for the first page.

Meanwhile, result information (e.g., scanning result information, OCR result information, and translation result information) including charge counts and processing results of services is not transmitted to the widget 21. Therefore, it may not be necessary to encrypt the result information using a common key.

Some Web services provided on the Internet charge a fixed monthly fee or charge for each job. Unlike the image forming apparatus 10 of this embodiment, charge counts for such Web services may not be recorded for each page (or each set of data).

In the above descriptions, a widget 21 (the translation-and-copying widget 21*c*) that requests the image forming apparatus 10 to perform the first service (scanning service) in a process flow is used. However, the process flow of a widget 21 may be flexibly configured and the starting point of the process flow is not limited to the image forming apparatus 10. For example, a widget 21 (hereafter called a translation-and-printing widget) may be configured to perform an OCR process on image data stored in the user terminal 20, to translate the OCR data, and to print the translated data. The above embodiments may also be applied to the translation-and-printing widget. More particularly, the processes described with reference to FIGS. 7 and 10 may also be applied to the translation-and-printing widget. If the translation-and-printing widget is selected in FIG. 10, steps other than steps S134 through S136 in FIGS. 14A and 14B are performed. Accordingly, in this case, no scanned image is transmitted to the translation-and-printing widget in step S139.

Thus, an aspect of the present invention provides a billing management system, an image forming apparatus, a billing management apparatus, a billing information recording method, and a storage medium that make it possible to simplify a charging system for services provided by a combination of an image forming apparatus and external applications.

The present invention is not limited to the specifically disclosed embodiments, and variations and modifications may be made without departing from the scope of the present invention.

The present application is based on Japanese Priority Application No. 2009-174609, filed on Jul. 27, 2009, the entire contents of which are hereby incorporated herein by reference.

What is claimed is:

1. A billing management system, comprising:

a first apparatus and a second apparatus that are configured to preform processes when requested; and a billing management apparatus configured to manage billing information corresponding to the processes performed by the first apparatus and the second apparatus, wherein the first apparatus includes a generating unit configured to generate identification information for a process flow that is performed through collaboration between the first apparatus and the second apparatus, in response to a request to start the process flow, an identification information transmitting unit configured to transmit the generated identification information to the billing management apparatus, a process execution unit configured to perform a first process assigned to the first apparatus according to the process flow, a billing information transmitting unit configured to transmit billing information for the first process performed by the process execution unit together with the identification information to the billing management apparatus, and a data transfer unit configured to transfer output data of the first process performed by the process execution unit together with the identification information to the second apparatus, the second apparatus performing a second process according to the process flow and transmitting billing information for the second process together with the identification information to the billing management apparatus; and the billing management apparatus includes an identification information receiving unit configured to receive the identification information transmitted from the first apparatus, a billing information receiving unit configured to receive the billing information for the first process and the billing information for the second process together with the identification information from the first apparatus and the second apparatus, respectively, and a billing information recording unit configured to record the billing information for the first process and the billing information for the second process in a billing information storing unit in association with the identification information.

2. The billing management system as claimed in claim 1, wherein the first apparatus further includes an encryption key providing unit configured to generate an encryption key and to transmit the encryption key together with the identification information to the second apparatus; and when multiple cycles of the process flow are to be performed, the data transfer unit is configured to encrypt the output data of the first process performed by the process execution unit using the encryption key in one or more of the cycles of the process flow and to transfer the encrypted output data to the second apparatus.

3. The billing management system as claimed in claim 2, wherein the data transfer unit is configured to encrypt the output data using the encryption key in some of the cycles of the process flow that are selected at intervals.

4. The billing management system as claimed in claim 2, wherein when receiving, from the first apparatus or the second apparatus, the identification information and information indicating failure of a process in one of the cycles of the process flow where the output data are encrypted, the billing information receiving unit is configured to nullify the billing information corresponding to the received identification information.

5. The billing management system as claimed in claim 4, wherein when receiving, from the first apparatus or the second apparatus, the identification information and information indicating failure of a process in one of the cycles of the process flow where the output data are not encrypted, the billing information receiving unit is configured to not nullify the billing information corresponding to the received identification information.

6. A method of recording billing information performed by a first apparatus and a second apparatus that are configured to perform processes when requested, and a billing management apparatus configured to manage billing information corresponding to the processes performed by the first apparatus and the second apparatus, the method comprising:

the steps, performed by the first apparatus, of generating identification information for a process flow that is performed through collaboration between the first apparatus and the second apparatus, in response to a request to start the process flow, transmitting the generated identification information to the billing management apparatus, performing a first process assigned to the first apparatus according to the process flow, transmitting billing information for the first process together with the identification information to the billing management apparatus, transferring output data of the first process together with the identification information to the second apparatus, the second apparatus performing a second process according to the process flow, and transmitting billing information for the second process together with the identification information to the billing management apparatus; and the steps, performed by the billing management apparatus, of receiving and registering the identification information transmitted from the first apparatus, receiving the billing information for the first process and the billing information for the second process together with the identification information from the first apparatus and the second apparatus, respectively, and recording the billing information for the first process and the billing information for the second process in a billing information storing unit in association with the identification information.

7. The billing management system as claimed in claim 1, further comprising:

an information processing apparatus including a setting unit configured to set process flow information on the process flow, a process flow information transmitting unit configured to transmit the process flow information to the first apparatus, and a data transmitting unit configured to receive the output data and the identification information transmitted from the data transfer unit of the first apparatus and to transmit the output data and the identification information to the second apparatus; wherein the first apparatus further includes a user interface unit configured to allow a user to select and start the process flow; and the data transfer unit of the first apparatus is configured to transmit the output data and the identification information to the information processing apparatus that has transmitted the process flow information.

8. The billing management system as claimed in claim 1, wherein the generating unit is configured to generate management information including information on the first and second processes to be performed by the first and second apparatuses in the process flow, a process result field for recording results of the first and second processes, a billing information field for recording the billing information for the first and second processes, and the identification information that are associated with each other;

the identification information transmitting unit is configured to transmit the management information including the identification information to the billing management apparatus;

the billing information transmitting unit is configured to transmit a result of the first process and the billing information for the first process together with the identification information to the billing management apparatus;

the identification information receiving unit is configured to receive the management information including the identification information;

the billing information receiving unit is configured to receive the results of the first and second processes, the billing information for the first process, and the billing information for the second process together with the identification information from the first apparatus and the second apparatus, respectively; and the billing information recording unit is configured to record the results of the first and second processes, the billing information for the first process, and the billing information for the second process in the billing information storing unit in association with the identification information.

9. The method of recording billing information as claimed in claim 6, wherein the first apparatus further includes an encryption key providing unit configured to generate an encryption key and to transmit the encryption key together with the identification information to the second apparatus; and when multiple cycles of the process flow are to be performed, encrypting the output data of the first process performed using the encryption key in one or more of the cycles of the process flow and transferring the encrypted output data to the second apparatus.

10. The method of recording billing information as claimed in claim 9, wherein the output data is encrypted using the encryption key in some of the cycles of the process flow that are selected at intervals.

11. The method of recording billing information as claimed in claim 9, wherein when receiving, from the first apparatus or the second apparatus, the identification information and information indicating failure of a process in one of the cycles of the process flow where the output data are encrypted, nullifying the billing information corresponding to the received identification information.

12. The method of recording billing information as claimed in claim 11, wherein when receiving, from the first apparatus or the second apparatus, the identification information and information indicating failure of a process in one of the cycles of the process flow where the output data are not encrypted, not nullifying the billing information corresponding to the received identification information.

13. The method of recording billing information as claimed in claim 6, further comprising:

setting, at an information processing apparatus, process flow information on the process flow, transmitting the process flow information to the first apparatus, and receiving the output data and the identification information transmitted from the first apparatus, and transmitting the output data and the identification information to the second apparatus; wherein the first apparatus further includes a user interface unit configured to allow a user to select and start the process flow; and the first apparatus is configured to transmit the output data and the identification information to the information processing apparatus that has transmitted the process flow information.

14. The method of recording billing information as claimed in claim 6, further comprising:

generating management information including information on the first and second processes to be performed by the first and second apparatuses in the process flow, a process result field for recording results of the first and second processes, a billing information field for recording the billing information for the first and second processes, and the identification information that are associated with each other;

transmitting the management information including the identification information to the billing management apparatus;

transmitting a result of the first process and the billing information for the first process together with the identification information to the billing management apparatus;

receiving the management information including the identification information;

receiving the results of the first and second processes, the billing information for the first process, and the billing information for the second process together with the identification information from the first apparatus and the second apparatus, respectively; and recording the results of the first and second processes, the billing information for the first process, and the billing information for the second process in the billing information storing unit in association with the identification information.

15. A billing management apparatus that manages billing information corresponding to processes performed by a first apparatus and a second apparatus when requested, comprising:

an identification information receiving unit configured to receive identification information transmitted from the first apparatus, the first apparatus generating the identification information for a process flow that is performed through collaboration between the first apparatus and the second apparatus, in response to a request to start the process flow, a billing information receiving unit configured to receive billing information for a first process performed by the first apparatus and billing information for a second process performed by the second apparatus together with the identification information from the first apparatus and the second apparatus, respectively, and a billing information recording unit configured to record the billing information for the first process and the billing information for the second process in a billing information storing unit in association with the identification information.

* * * * *